United States Patent
Kameshima et al.

(10) Patent No.: US 6,271,880 B1
(45) Date of Patent: *Aug. 7, 2001

(54) APPARATUS HAVING A PHOTOELECTRIC CONVERSION ELEMENT AND A TRANSISTOR, IN WHICH THE DURATION OF THE ON TIME OF THE TRANSISTOR IS BASED ON A DETECTED TEMPERATURE OF THE CONVERSION ELEMENT OR TRANSISTOR

(75) Inventors: Toshio Kameshima, Sagamihara; Noriyuki Kaifu, Hachioji, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/805,066

(22) Filed: Feb. 25, 1997

(30) Foreign Application Priority Data

Feb. 26, 1996 (JP) ............................................... 8-038135
Mar. 28, 1996 (JP) ............................................... 8-074183

(51) Int. Cl.[7] ............................ H04N 9/64; H04N 3/14
(52) U.S. Cl. ................... 348/244; 348/297; 348/303
(58) Field of Search ......................... 348/229, 230, 348/231, 241, 243, 244, 297, 298, 302, 303, 304, 305, 306, 307, 308, 309, 310; 257/467, 469, 470, 206, 509, 512, 513, 514; 250/206

(56) References Cited

U.S. PATENT DOCUMENTS

| | | | |
|---|---|---|---|
| 4,551,760 | 11/1985 | Bendell | 358/213 |
| 4,635,126 | 1/1987 | Kinoshita | 358/228 |
| 4,739,409 | * 4/1988 | Baumeister | 348/244 |
| 4,760,453 | * 7/1988 | Hieda | 348/243 |
| 4,922,117 | 5/1990 | Saika et al. | 250/578.1 |
| 4,939,592 | 7/1990 | Saika et al. | 358/482 |
| 4,942,473 | * 7/1990 | Zeevi et al. | 348/281 |
| 5,038,369 | 8/1991 | Nishiki | 378/62 |
| 5,519,437 | * 5/1996 | Nelvig | 348/162 |

FOREIGN PATENT DOCUMENTS

| | | |
|---|---|---|
| 561559A2 | 9/1993 | (EP) . |
| 660421A2 | 6/1995 | (EP) . |

* cited by examiner

Primary Examiner—Wendy R. Garber
Assistant Examiner—Jacqueline Wilson
(74) Attorney, Agent, or Firm—Fitzpatrick, Cella, Harper & Scinto

(57) ABSTRACT

A photoelectric conversion apparatus has a photoelectric conversion element, a transistor for transferring a signal from the photoelectric conversion element, and a driver for supplying a drive pulse to the control electrode of the transistor. A temperature of the photoelectric conversion element and/or transistor is measured. The measured temperature is compared to a reference temperature, and based on that comparison, a length of the supplied drive pulse is made shorter or longer.

25 Claims, 24 Drawing Sheets

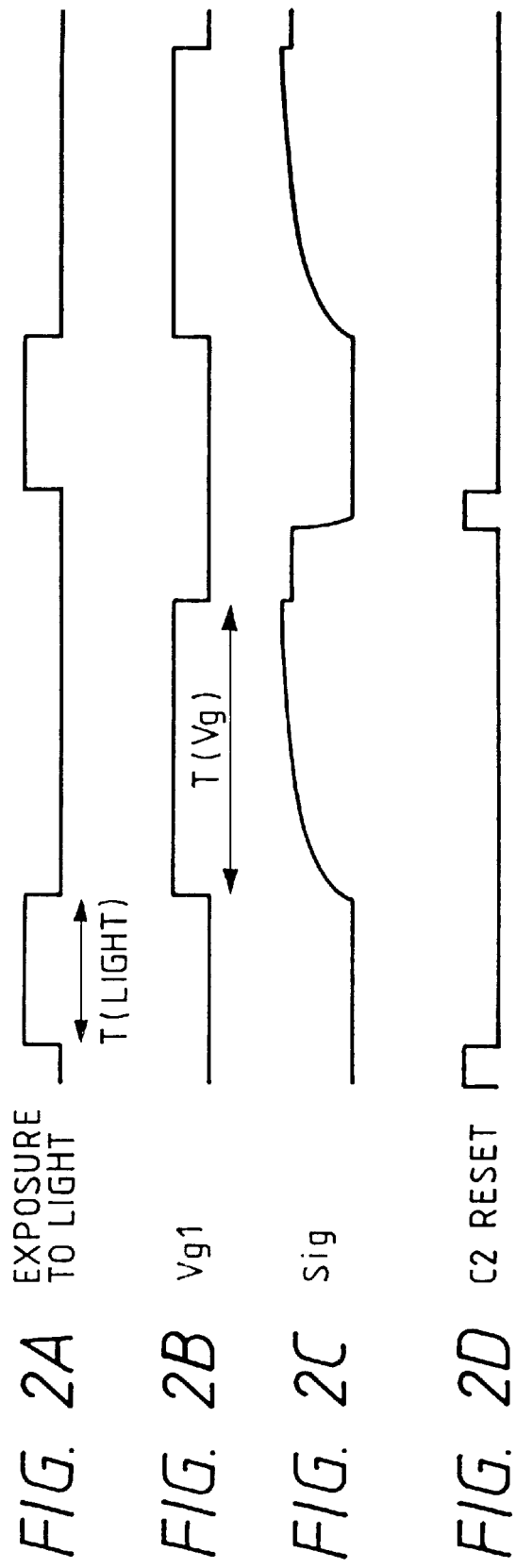

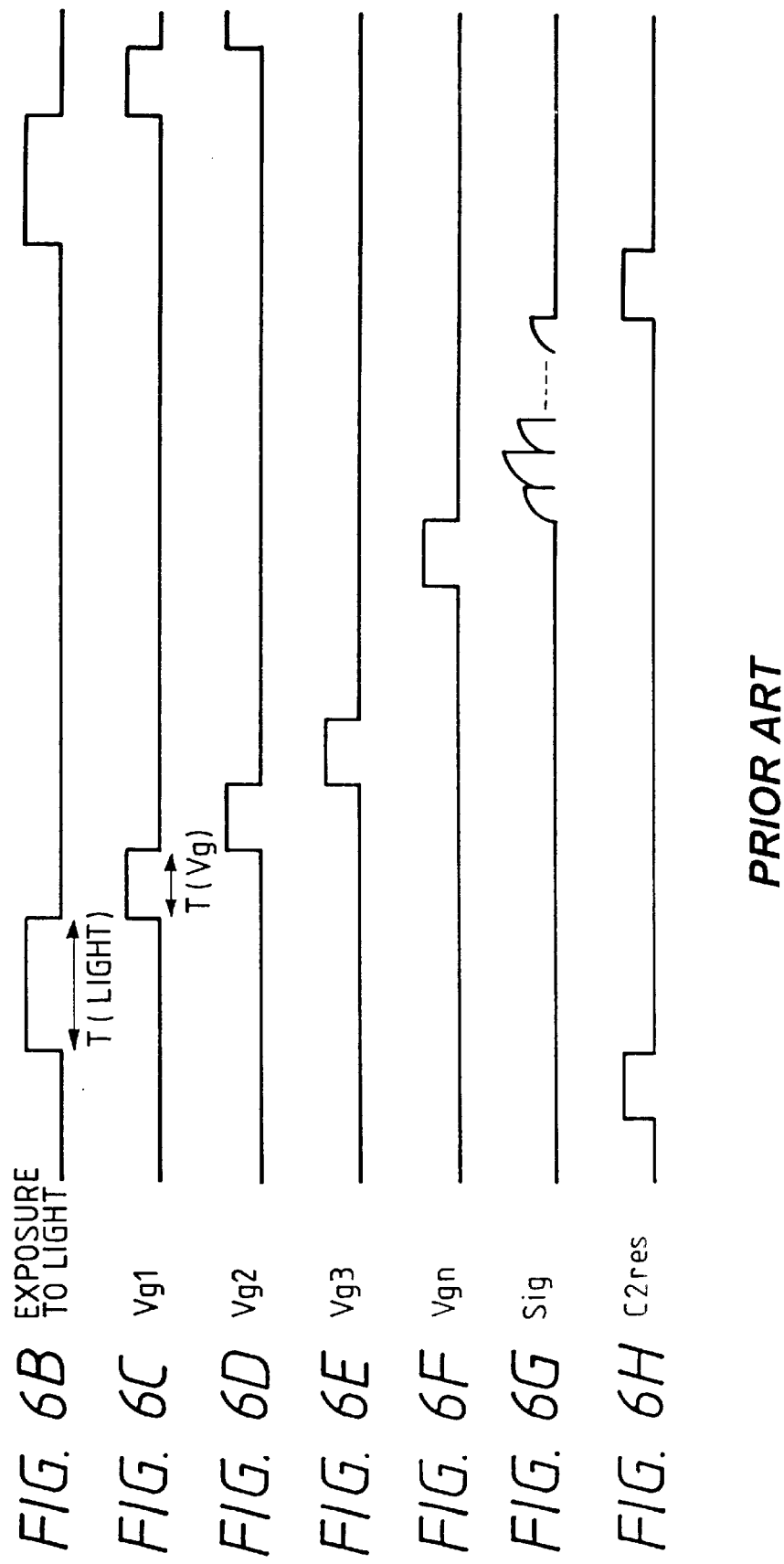

FIG. 14A EXPOSURE TO LIGHT
FIG. 14B Vg1
FIG. 14C Sig
FIG. 14D C2 RESET

APPARATUS HAVING A PHOTOELECTRIC CONVERSION ELEMENT AND A TRANSISTOR, IN WHICH THE DURATION OF THE ON TIME OF THE TRANSISTOR IS BASED ON A DETECTED TEMPERATURE OF THE CONVERSION ELEMENT OR TRANSISTOR

BACKGROUND OF THE INVENTION

1. Field of the Invention

The present invention relates to a photoelectric conversion apparatus and driving method thereof and, more particularly, to a photoelectric conversion apparatus and driving method thereof capable of outputting signals at higher S/N ratios.

2. Related Background Art

FIG. 1 is a schematic circuit diagram to show the schematic configuration of a photoelectric conversion apparatus. In FIG. 1, S1 indicates a photoelectric conversion element which is comprised of a photodiode P1 and a capacitor C1 herein. Numeral 1 designates a power supply, connected to the photoelectric conversion element, for applying a bias to the photodiode. T1 represents a thin-film transistor (hereinafter referred to as TFT) for transmitting a charge generated according to a quantity of incident light at the photoelectric conversion element S1 to a reading circuit 2. The reading circuit 2 is composed of a capacitor C2, an amplifier A1, and a capacitor resetting switch SW1. Further, numeral 3 denotes a gate driving circuit for applying a voltage (gate pulse Vg) to the gate electrode of TFT T1. In general, the photoelectric conversion element S1 and TFT T1 are obtained by simultaneously forming a semiconductor of each portion using a thin-film semiconductor of amorphous silicon or the like.

FIGS. 2A, 2B, 2C and 2D are timing charts to show the reading timing of the above photoelectric conversion apparatus. As shown in FIG. 2A, light is pulsed light radiated for the time of T(light). After exposure to light causes the charge due to the light to accumulate in the photoelectric conversion element S1, the gate driving circuit 3 applies a gate pulse Vg1 (of pulse width T(Vg)) as shown in FIG. 2B to flip TFT T1 on and then to transfer the charge due to the light to the reading circuit 2. The charge thus transferred is amplified in the reading circuit 2 to be output as an analog image signal Sig (FIG. 2C). After output of the analog image signal, the potential of capacitor C2 in the reading circuit 2 is reset by reset switch SW1 (FIG. 2D).

In the photoelectric conversion apparatus the time T(Vg) to keep the gate of TFT on is set, in general, based on a time constant determined by values of:

(1) capacitance C1 of photoelectric conversion element and capacitance C2 of reading circuit;

(2) on resistance Ron of TFT.

As shown in an example of FIG. 3, the on resistance Ron of TFT of amorphous silicon (reflecting the mobility) is greatly dependent on the temperature and the resistance becomes higher especially at low temperatures (i.e., the mobility decreases).

FIG. 4 shows the relationship between charge transfer efficiency in transferring the charge occurring in the photoelectric conversion element, that is, the charge accumulated in the capacitor C1, to the capacitor C2 of reading circuit, and gate pulse time, and temperature dependence thereof. The gate pulse time necessary for transferring the charge generated in the photoelectric conversion element varies depending upon the temperature. The lower the temperature, the longer the gate pulse time necessary for transfer of charge. In FIG. 4 the gate pulse time necessary for 99% transfer (1% remainder of transfer) at a high temperature is defined as T(Vg)H and the gate pulse time necessary for 99% transfer at a low temperature as T(Vg)L. The gate pulse times at the respective temperatures are in the following relation;

$$T(Vg)L > T(Vg)H.$$

Accordingly, in the photoelectric conversion apparatus the on time of TFT was set to T(Vg)L so as to achieve sufficient transfer of charge even at low temperatures.

However, the dark current always flows in the photoelectric conversion element. As shown in FIG. 5, the dark current Id of sensor is also dependent on the temperature and the dark current increases with rise of temperature. Namely, there is the following relation:

$$Id(HT) > Id(LT).$$

During exposure to light and during reading of charge with TFT on after exposure to light, the dark current Id continuously flows in the photoelectric conversion element to affect the reading signal in the form of noise. Therefore, when the on time of TFT is set as long as T(Vg)L in consideration of the transfer of charge at low temperatures as in the above photoelectric conversion apparatus, charges due to the dark current at a high temperature and at a low temperature are in the following relation:

| High temperature | Low temperature |
|---|---|
| $Id(HT) \times (T(Vg)L + T(Light))$ > | $Id(LT) \times (T(Vg)L + T(Light));$ | and thus, the quantity of charge due to the dark current varies against the charge due to exposure to light.

This will appear as reduction of S/N ratio at high temperatures. The reduction of S/N ratio becomes especially outstanding when the exposure-to-light time T(light) and the on time of TFT T(Vg) are in the following relation:

$$T(Vg) > T(Light).$$

Further, the problem due to the dark current (the reduction of S/N ratio) becomes more outstanding where the apparatus is arranged to comprise a plurality of photoelectric conversion elements and TFTs and to read charges thereof in order using a shift register and the like, as shown in FIG. 6A.

In FIG. 6A, S1 to Sn are photoelectric conversion elements which are comprised of photodiodes P1 to Pn and capacitors C1-1 to C1-n herein. Numeral 1 designates a power supply, connected to the photoelectric conversion elements S1 to Sn, for applying a bias to the photodiodes P1 to Pn. T1 to Tn are TFTs for transferring charges generated according to the quantity of incident light in the photoelectric conversion elements S1 to Sn to the reading circuit 2. In this example the reading circuit 2 is composed of capacitors C2-1 to C2-n, amplifiers A1-1 to A1-n, and capacitor resetting switches SW1-1 to SW1-n. Numeral 4 denotes an analog multiplexer for successively selecting outputs from the reading circuit 2 and outputting them as analog image signals. Further, numeral 5 represents a shift register for applying the gate pulse to TFT T1 to Tn of each pixel.

FIGS. 6B, 6C, 6D, 6E, 6F, 6G and 6H are timing charts to show an example of the reading timing of the photoelectric conversion apparatus of FIG. 6A. As shown in FIG. 6B, the light is pulsed light radiated for the time of T(light). After the exposure to light causes the charge due to light to accumulate in the photoelectric conversion elements, the shift register 5 successively applies the gate pulses Vg1 to VgN as shown in FIGS. 6C, 6D, 6E and 6F to flip TFTs T1 to Tn on in order and then to transfer the charges due to the light to the reading circuit 2. The charges transferred are amplified in the reading circuit 2 and the analog multiplexer 4 successively outputs them as analog image signals Sig (FIG. 6G).

In the configuration to read the signals by using the shift register 5 to successively turn the n TFTs T1 to Tn on as shown in FIG. 6A, the time necessary for reading is T(Vg)×n and this time increases in proportion to the number of lines to be driven.

In each photoelectric conversion element, not only the charge Qp due to light but also the charge Qd due to the dark current Id are accumulated during reading of charge with TFT on after exposure to light. For example, the following charge due to the dark current accumulates in the photoelectric conversion element Sn of FIG. 6A before application of Vgn to TFT Tn.

$$Qd=(T(light)+(N-1)\times T(Vg))\times Id.$$

Accordingly, similarly as described with foregoing FIG. 1, if the on time of TFT is set as long as T(Vg)L in consideration of transfer of charge at low temperatures, quantities of charges Qd due to the dark current at a high temperature and at a low temperature will differ against reading light signals (charges Qp due to light). For example, letting Id(HT) be the dark current at the high temperature and Id(LT) be the dark current at the low temperature, S/N in the photoelectric conversion element Sn at each temperature is given as follows.

$$S/N \text{ (high temperature)}=(Qp/Qd(HT))=Qp/(T(light)+(N-1)\times T(Vg)L)\times Id(HT)$$

$$S/N \text{ (low temperature)}=(Qp/Qd(LT))=Qp/(T(light)+(N-1)\times T(Vg)L)\times Id(LT)$$

Here, $$(T(light)+(N-1)\times T(Vg)L)\times Id(HT)>(T(light)+(N-1)\times T(Vg)L)\times Id(LT)$$

$$Qd(HT)>Qd(LT)$$

Namely, the component due to the dark current in the charge accumulated in the capacitor C1 is greater at the high temperature than at the low temperature, and the ratio of the component due to the dark current further increases with increase in the line number n. Accordingly, the worst case of S/N will occur with many lines and at high temperatures.

Namely, there was the problem that S/N varied between at high temperatures and at low temperatures and S/N particularly at high temperatures was not sufficient in some cases.

If the transfer time is shortened in order to decrease the component of dark current even a little, it would result in failing to achieve sufficient transfer of signal, of course. In this case there was also the problem that sufficient S/N could not be attained and the dynamic range could be narrowed.

SUMMARY OF THE INVENTION

The present invention has been accomplished in view of the above problems in the photoelectric conversion apparatus and an object of the invention is to provide a photoelectric conversion apparatus and driving method thereof with good S/N, free of influence due to the temperature change.

A further object of the present invention is to provide a photoelectric conversion apparatus and driving method thereof with a good dynamic range.

An additional object of the present invention is to provide a photoelectric conversion apparatus and driving method that can obtain image information with many gray levels and with high quality.

Another object of the present invention is to provide a photoelectric conversion apparatus comprising a photoelectric conversion element for converting an incident light signal to an electric signal, a transistor for performing a transfer control of the electric signal from the photoelectric conversion element, and driving means for applying a transfer control signal to a control electrode of the transistor, the photoelectric conversion apparatus having control means for controlling the driving means so as to detect a temperature of the photoelectric conversion element or/and the transistor and to change an on time of the transistor according to the temperature detected.

An additional object of the present invention is to provide a driving method of a photoelectric conversion apparatus having a photoelectric conversion element, a transistor for transferring a signal from the photoelectric conversion element, and driving means for supplying a drive pulse to a control electrode of the transistor, the driving method comprising a first step for measuring a temperature of the photoelectric conversion element or the transistor, and a second step for changing the drive pulse in accordance with information of the temperature.

BRIEF DESCRIPTION OF THE DRAWINGS

FIGS. 2A, 2B, 2C and 2D are schematic timing charts to illustrate an example of drive of the photoelectric conversion apparatus;

FIGS. 6B, 6C, 6D, 6E, 6F, 6G and 6H are timing charts for explaining an example of drive of the photoelectric conversion apparatus;

DETAILED DESCRIPTION OF THE PREFERRED EMBODIMENTS

Embodiments of the present invention will be described in detail with reference to the drawings.
(First Embodiment)

Figure 7:
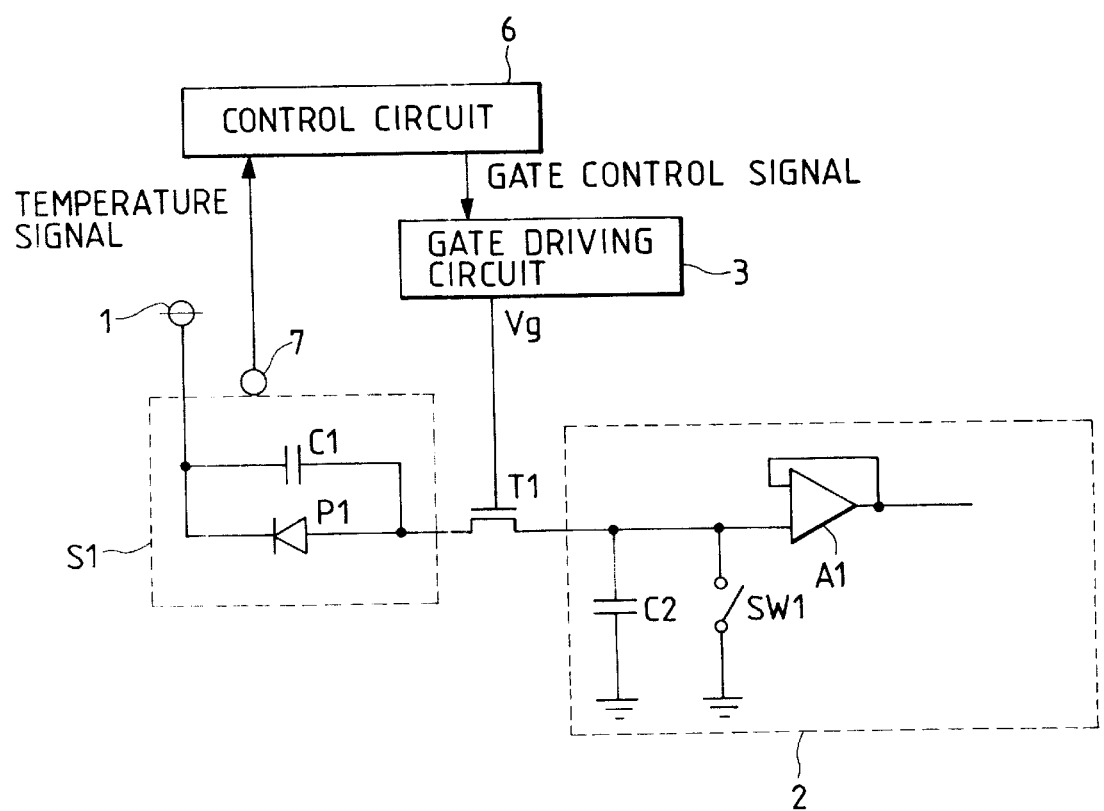
FIG. 7 is a schematic circuit diagram of a photoelectric conversion apparatus.

FIG. 7 illustrates a schematic circuit diagram of a first preferred embodiment of the photoelectric conversion apparatus according to the present invention. In FIG. 7, the elements with the same functions as those in the example shown in FIG. 1 will be explained using the same reference symbols. In FIG. 7, S1 is a photoelectric conversion element, which is comprised of a photodiode P1 and a capacitor C1 herein and to which a bias is applied by the power supply 1. T1 is a TFT for transferring the charge generated in the photoelectric conversion element S1 to the reading circuit 2. Normally, the photoelectric conversion element S1 and TFT T1 are simultaneously film-formed by the amorphous silicon process or the like. In this example the reading circuit 2 is composed of a capacitor C2, an amplifier A1, and a capacitor resetting switch SW1. In general, this reading circuit is an external IC. Further, a gate driving circuit 3 (driving means) for applying a gate pulse Vg for on/off of gate is connected to the gate electrode (control electrode) of TFT T1.

A temperature sensor 7 (temperature detecting means) for detecting the temperature and outputting a temperature signal is positioned near the photoelectric conversion element S1 or/and TFT T1. The temperature signal from the temperature sensor 7 is put into the control circuit 6 and the control circuit 6 outputs a gate control signal for changing the gate pulse time of TFT according to the temperature to the gate driving circuit 3. In response to the foregoing gate control signal, the gate driving circuit 3 changes the on time of TFT, that is, the gate pulse time according to the temperature detected at the photoelectric conversion element S1 or TFT T1. Specifically,

|  | High temperature | Low temperature |
| --- | --- | --- |
| Photoelectric conversion element | large dark current | small dark current |
| TFT | transfer efficiency ↓ | transfer efficiency ↓ |
| Vg time | short | long |

In this way the control circuit 6 generates the gate control signal so that the on time of the gate of TFT becomes shorter at high temperatures and longer at low temperatures. In the present embodiment the control circuit 6 and temperature sensor 7 compose the control means.

Figure 8:
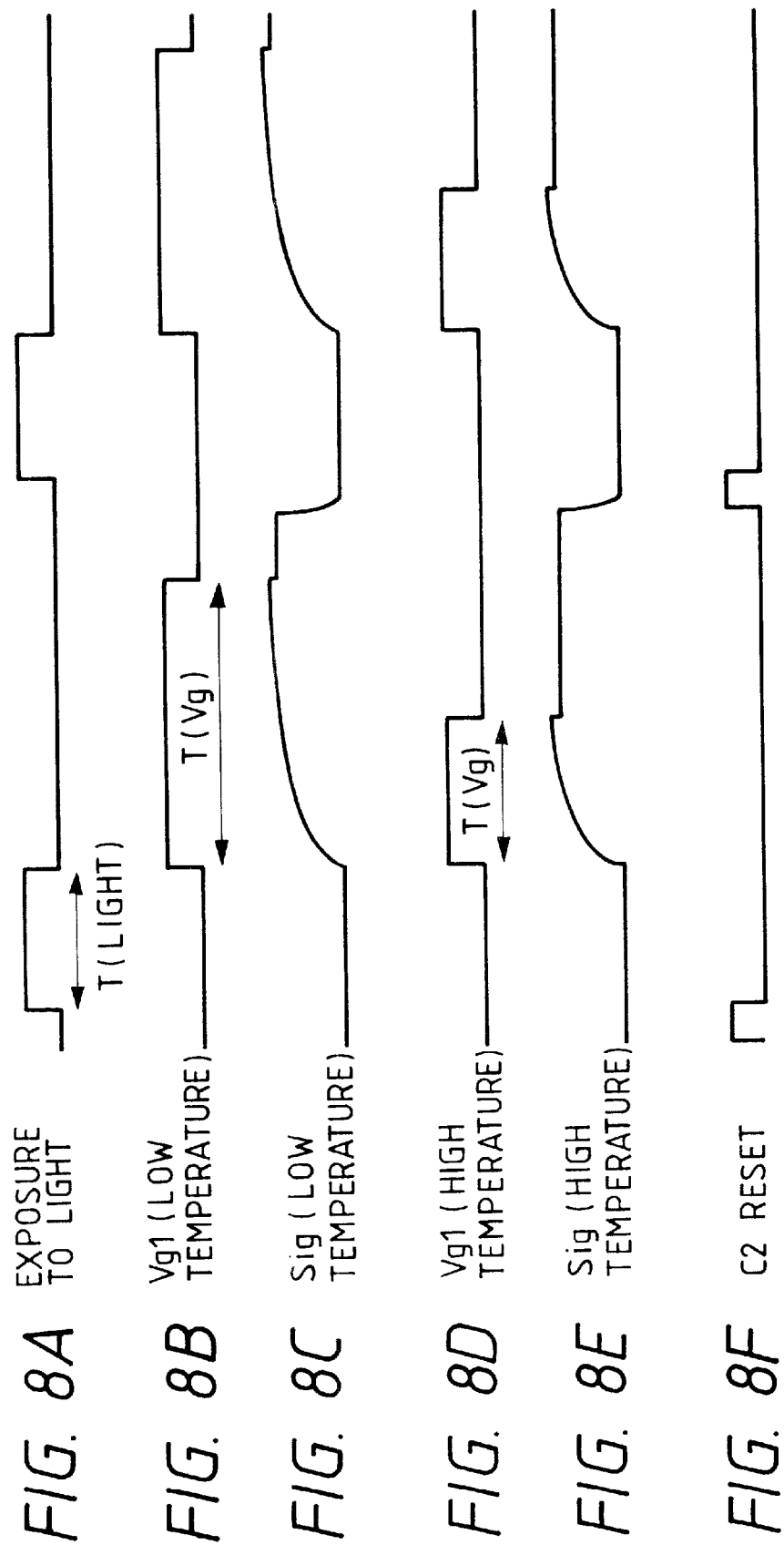
FIGS. 8A, 8B, 8C, 8D, 8E and 8F are timing charts for explaining an example of drive of the photoelectric conversion apparatus.

FIGS. 8A to 8F are schematic timing charts for explaining an example of drive in the embodiment of the present invention described with FIG. 7. FIG. 8A shows the timing for exposing the subject to be read by the photoelectric conversion element to light (which is explained as pulsed light in this figure). FIG. 8B and FIG. 8C illustrate the gate pulse signal Vg1 and analog image signal Sig, respectively, when the temperature detected is a low temperature. Similarly, FIG. 8D and FIG. 8E illustrate the gate pulse and analog image signals, respectively, when the detected temperature is a high temperature. FIG. 8F illustrates the timing for resetting the capacitor C2 in the reading circuit 2 of FIG. 7. Although FIG. 8F shows the example in which the timing for resetting the capacitor C2 is not changed against the temperature detected by the temperature sensor 7, intervals of resetting C2 may be arranged to vary, similarly as the gate pulse time is.

Figure 4:
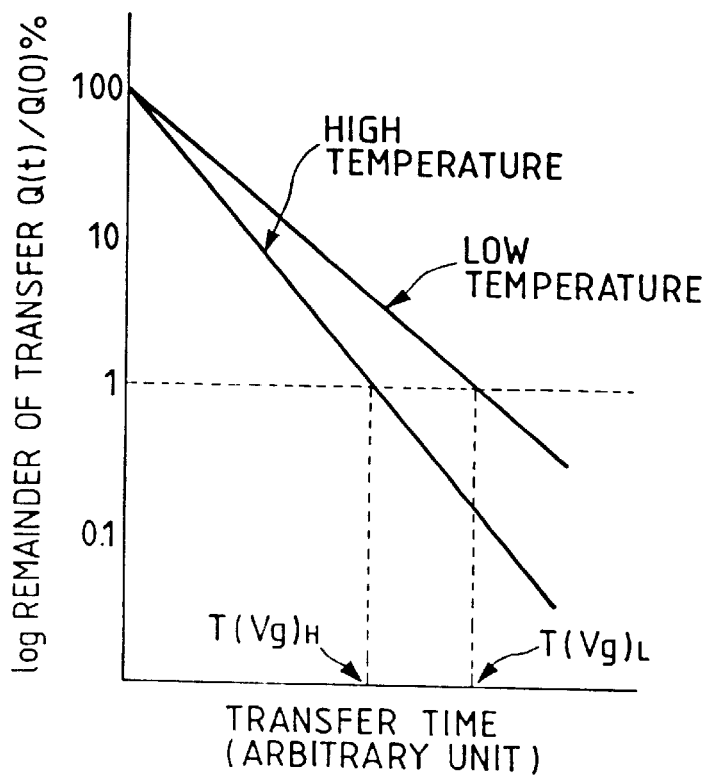
FIG. 4 is a drawing for explaining temperature dependence of charge transfer.
Figure 5:
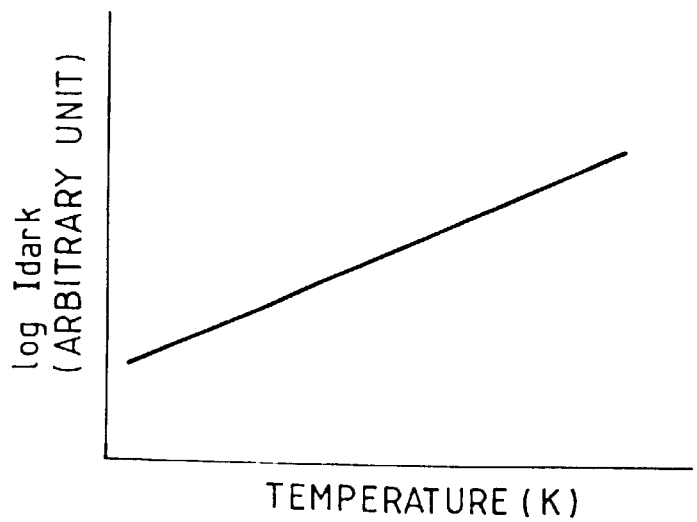
FIG. 5 is a drawing for explaining temperature dependence of dark current of photoelectric conversion element.

Here, the gate pulse time at each temperature is determined in consideration of the temperature dependence of transfer efficiency of FIG. 4 and the temperature dependence of the sensor dark current shown in FIG. 5. By employing such an arrangement that the gate pulse time of TFT is changed depending upon the temperature information from the temperature sensor provided near the photoelectric conversion element and TFT as described above, it becomes possible to realize the photoelectric conversion apparatus with little S/N drop due to the dark current of photoelectric conversion element even with change in temperature.

Described below are a specific layer structure of the photoelectric conversion element and TFT, a location of the temperature sensor, and a schematic circuit configuration of the photoelectric conversion apparatus.

Figure 9:
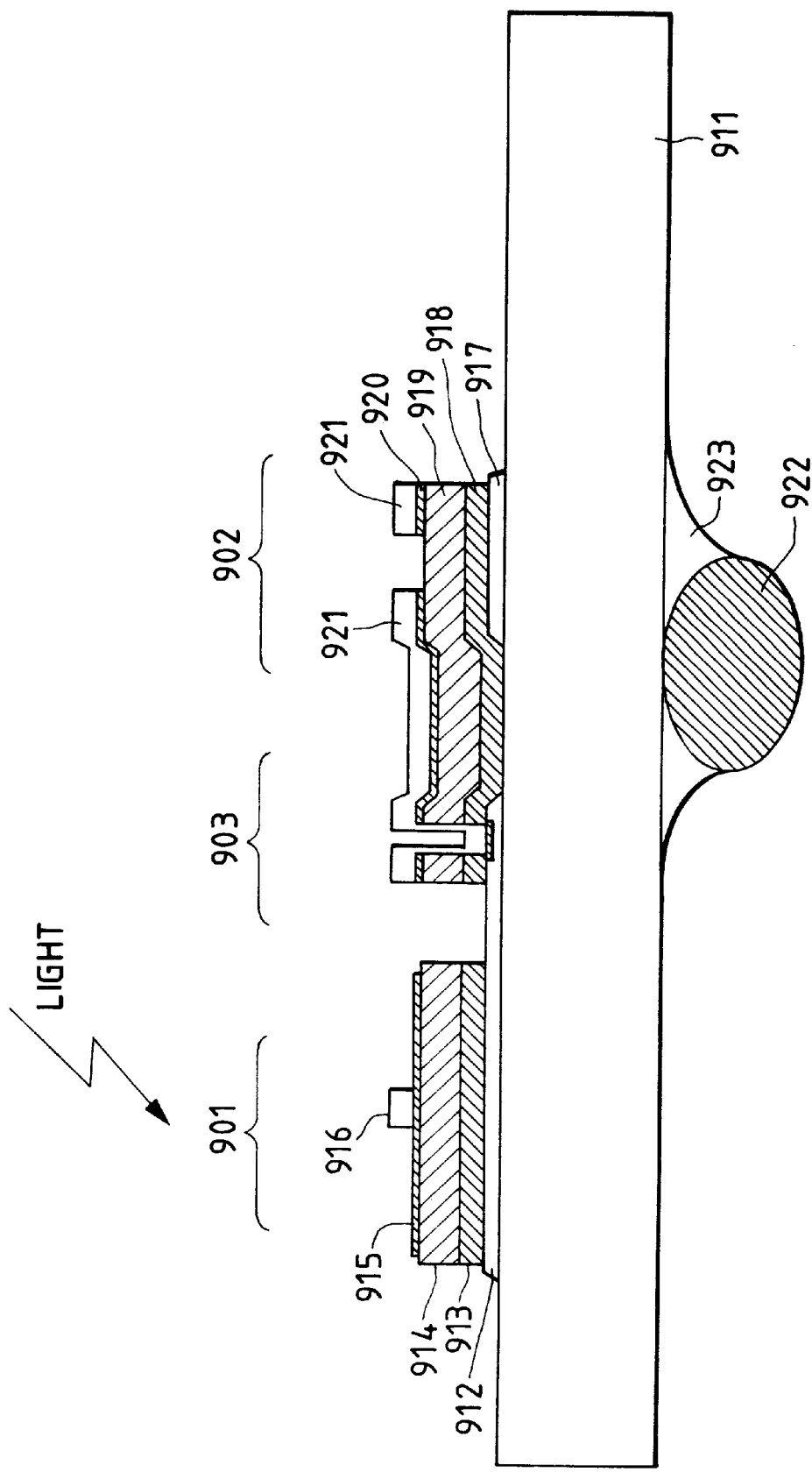
FIG. 9 is a schematic cross-sectional view for explaining an example of the photoelectric conversion apparatus.
Figure 10:
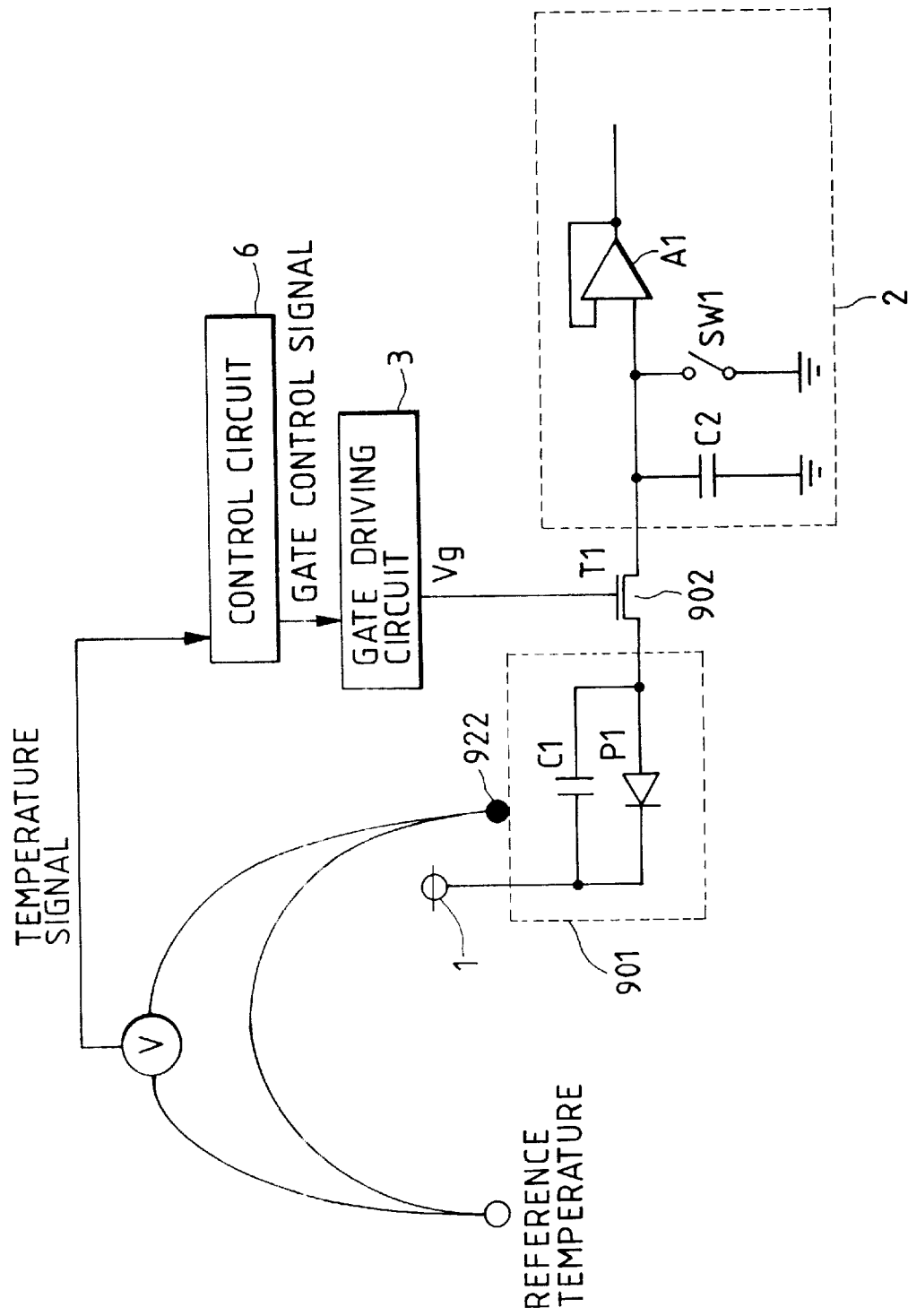
FIG. 10 is a schematic circuit diagram of a photoelectric conversion apparatus.

FIG. 9 is a schematic cross-sectional view for explaining the layer structure of photoelectric conversion element 901, TFT 902, and connecting section 903 and the temperature sensor of the photoelectric conversion apparatus, and FIG. 10 is a schematic circuit diagram for explaining an example of the temperature sensor.

In FIG. 9, numeral 911 designates a substrate having an insulating surface portion on which at least photoelectric conversion element 901 and TFT (thin film transistor) 902 are positioned, 912 a first electrode (lower electrode) of photoelectric conversion element 901, 913 an insulating layer, 914 a semiconductor layer, 915 an injection preventing layer, and 916 a second electrode (upper electrode), which are formed in order on the substrate 911. Further, numeral 917 denotes the gate electrode of TFT, 918 a gate insulating layer, 919 a semiconductor layer, 920 an ohmic contact layer, and 921 a source or drain electrode, which are formed in order on the substrate. Numeral 922 represents the temperature sensor, for example, a thermocouple.

The first electrode 912 and gate electrode 917 are made of an electroconductive material such as metal and can be formed by a same process. Further, the insulating layer 913 and gate insulating layer 918, and, the semiconductor layer 914 and semiconductor layer 919, each pair can be formed by a same process similarly. There are no specific restrictions on the material for the semiconductor layers 914, 919 as long as it has the photoelectric conversion effect and can realize the function of transistor. Normally, preferred materials are non-single-crystal materials, especially, such as silicon, silicon germanium, or germanium, and among others amorphous silicon and polycrystal silicon are preferred.

Similarly, the injection preventing layer 915 and ohmic contact layer 920 can also be formed by a same process. The injection preventing layer 915 and ohmic contact layer 920, though different in functional expression, both are, for example, of an n-type (or $n^+$-type) or p-type (or $p^+$-type) semiconductor layer.

As described, the photoelectric conversion element 901 and TFT 902 of the present embodiment have the same layer structure and thus each layer of the respective elements can be formed simultaneously by a film-forming process of each layer. A thermocouple as the temperature sensor 922 is attached (or bonded with an adhesive 923) to a surface (back surface) opposite to the surface of substrate 911 on which the photoelectric conversion element 901 etc. are provided. This thermocouple converts the temperature of substrate to a voltage (thermoelectromotive force), thereby detecting the temperature, and supplies the temperature signal to the control circuit 6. It is also possible to dispose the thermocouple on the side of the surface of substrate 911 on which the photoelectric conversion element 901 etc. are provided.

As shown in FIG. 10, the information about the temperature near the photoelectric conversion element 901 or TFT 902 is gained by the temperature sensor 922. When this information is input to the control circuit 6, the control circuit 6 supplies the gate control signal based on the temperature information to the gate driving circuit 3. The gate driving circuit 3 controls the length of the gate drive signal of TFT, eventually based on the temperature information, to perform optimal or more preferable reading of image information.

(Second Embodiment)

Figure 11:
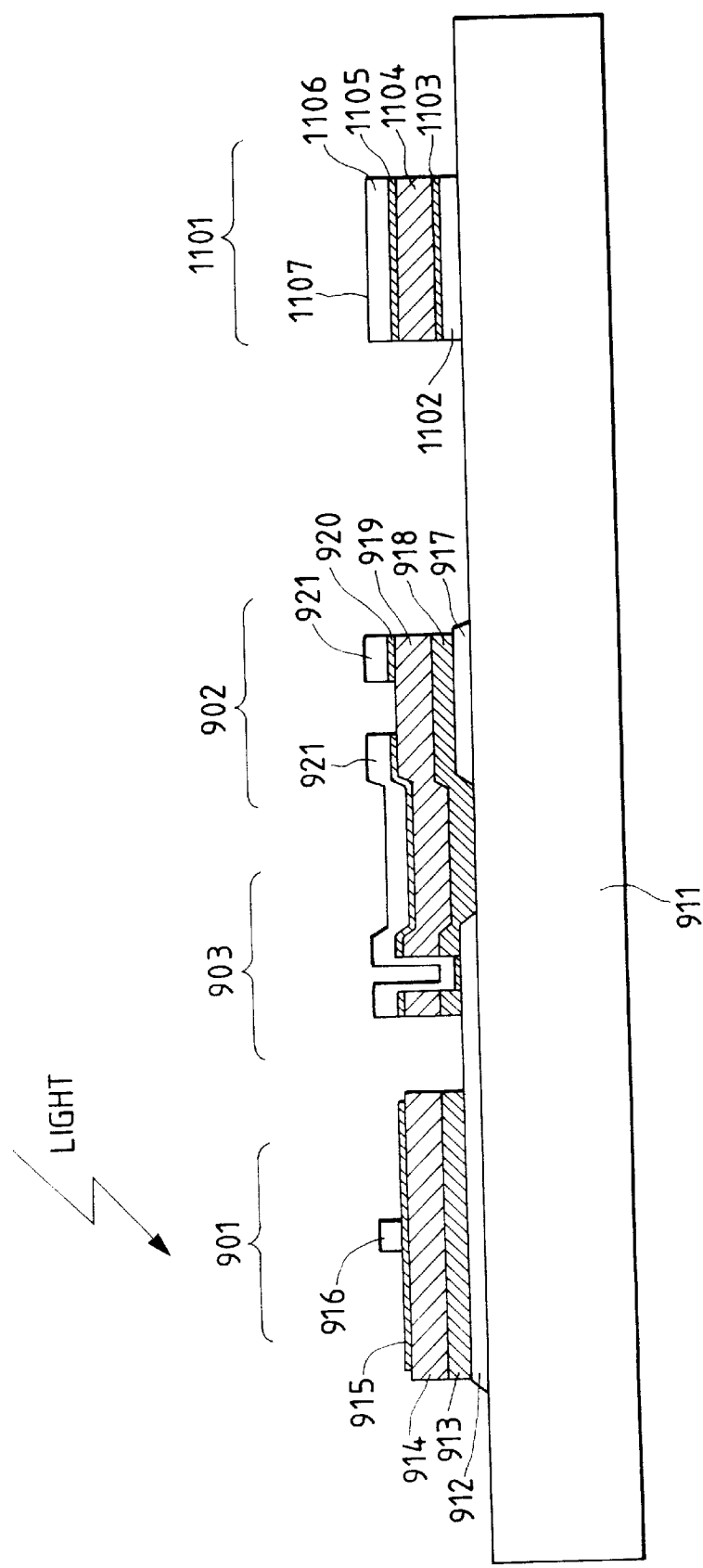
FIG. 11 is a schematic cross-sectional view for explaining an example of the photoelectric conversion apparatus.
Figure 12:
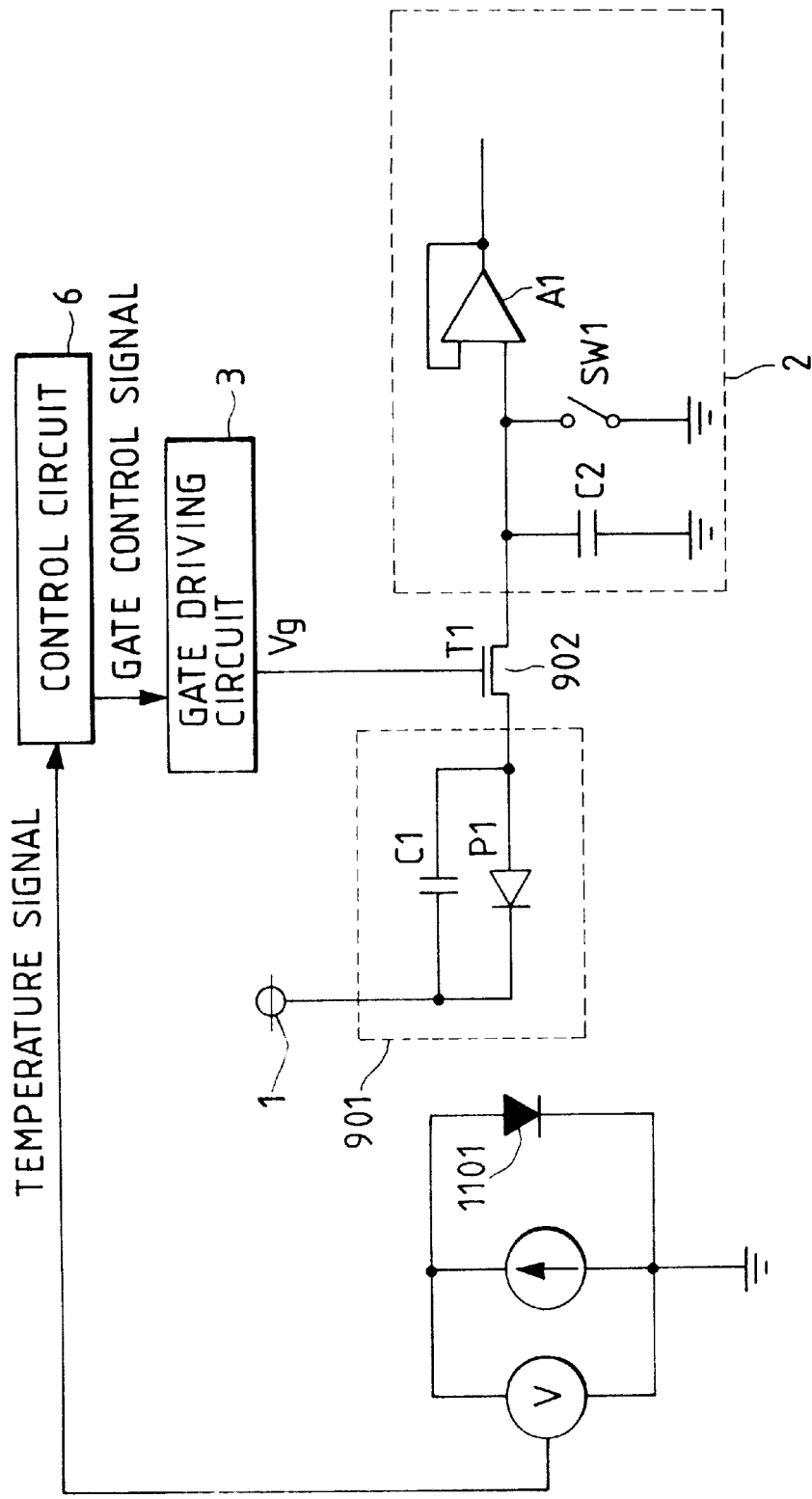
FIG. 12 is a schematic circuit diagram of a photoelectric conversion apparatus.

FIG. 11 is a schematic cross-sectional view to show the layer structure of the photoelectric conversion element 901, TFT 902, and connecting part 903, and a diode as a temperature sensor in the photoelectric conversion apparatus and FIG. 12 is a schematic circuit diagram to show an embodied example of the temperature sensor. In this example, a diode (pin diode) 1101 for measurement of temperature, which is a semiconductor element utilizing semiconductor characteristics, is mounted as a temperature sensor to the surface of substrate on which the photoelectric conversion element etc. are provided.

In FIG. 11, the same reference numerals as those of FIG. 9 denote the same members. An example of the temperature-measuring diode 1101 is illustrated in the structure wherein first electrode (lower electrode) 1102, p-type semiconductor layer 1103, semiconductor layer 1104, n-type semiconductor layer 1106, and second electrode (upper electrode) 1107 are provided in this order on the substrate 911.

In this example the temperature of substrate is detected utilizing the temperature dependence of $V_F$ (backward bias) of this temperature-measuring diode 1101. In order to interrupt incidence of light, the temperature-measuring diode is provided with the metal upper electrode 1107 to be shielded thereby. The layer structure of photoelectric conversion element 901, TFT 902, and connecting part 903 is the same as that of FIG. 9. Examples of the operation of the photoelectric conversion elements shown in FIG. 9 and FIG. 11 will be described hereinafter.

In FIG. 12, the same reference symbols designate the same elements as those in FIG. 10. As shown in FIG. 12, when the backward bias is applied to the temperature-measuring diode 1101, no electric current flows at low temperatures (voltage=0: supposing no leak current occurs herein). With rise of temperature thermal electrons are generated and the bias electric field moves the electrons to cause flow of electric current. A change of voltage at this time (or the voltage itself) is handled as a signal (temperature signal) carrying the temperature information. Alternatively, a constant current is made to flow in the forward direction in the temperature-measuring diode 1101, whereupon a potential difference $V_F$ appears between the terminals (between anode and cathod) of the temperature-measuring diode. $V_F$ has temperature dependence and can be handled as a temperature signal similarly as in the above example. After the temperature signal is input to the control circuit 6, the gate driving condition is changed according to the temperature information in the same manner as described in the previous example.

In this way image information with higher S/N can be output by controlling the drive, without effect due to the temperature change. For example, the temperature sensor may be any other element than the foregoing thermocouple and semiconductor element, and can be selected properly depending upon desired accuracy. For example, a bi-metal or a resistor may be applied.

(Third Embodiment)

Figure 1:
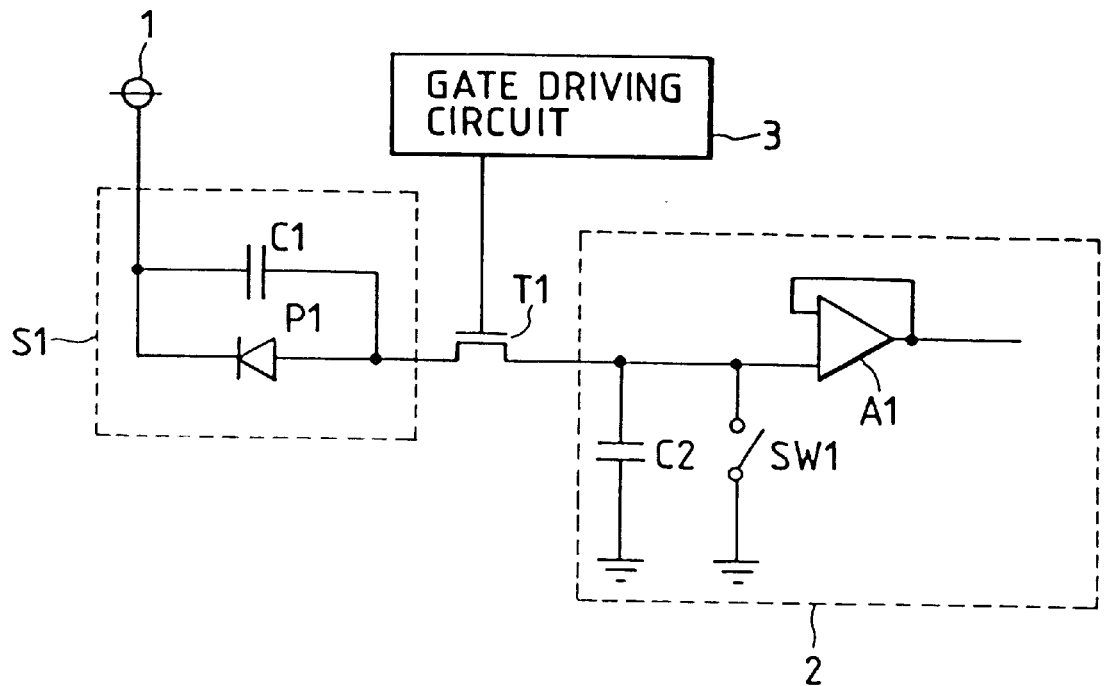
FIG. 1 is a schematic circuit diagram of the photoelectric conversion apparatus.
Figure 3:
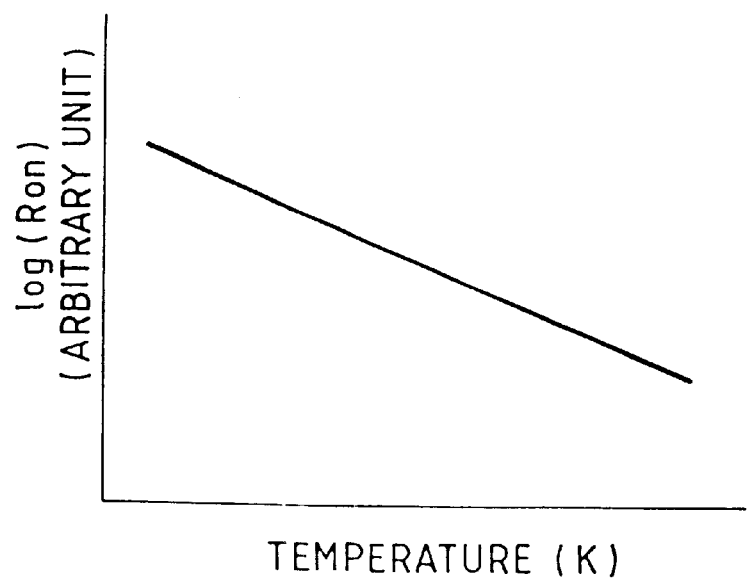
FIG. 3 is a drawing to illustrate temperature dependence of on resistance of TFT.
Figure 13:
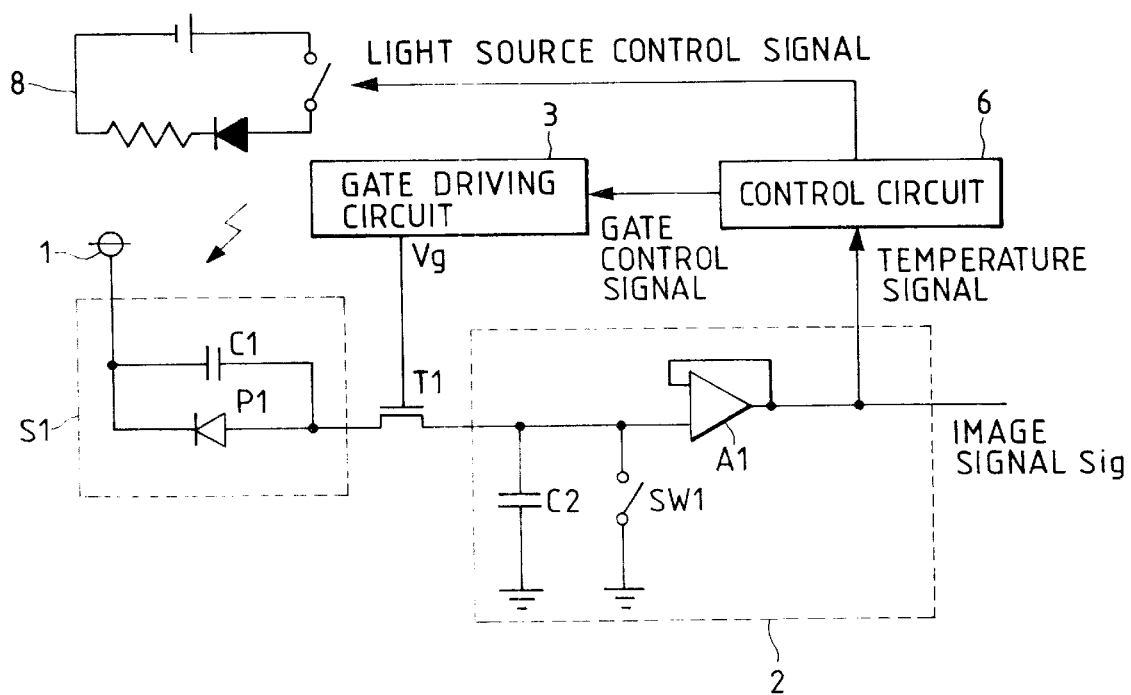
FIG. 13 is a schematic circuit diagram of an imaging apparatus having the photoelectric conversion apparatus.

FIG. 13 is a schematic circuit diagram of the third embodiment of the photoelectric conversion apparatus according to the present invention. FIG. 14A to FIG. 14D are schematic timing charts to illustrate an example of drive of the photoelectric conversion apparatus of the third embodiment. In the configuration of the present embodiment any separate temperature sensor is not used for detecting the temperature of photoelectric conversion element (S1) and TFT (T1). Instead thereof, a change of the dark current of the photoelectric conversion element (S1) itself depending upon the temperature is read to be used as a temperature signal. In FIG. 13, the elements having the same functions as those in FIG. 1 and FIG. 7 are denoted by the same reference symbols.

As shown in FIG. 14A to FIG. 14D, the photoelectric conversion apparatus of the third embodiment of the present invention shown in FIG. 13 has two drive modes, "temperature detection (dark detection) mode" for detecting the temperature of photoelectric conversion element (S1) and TFT (T1) and "read mode" for reading image information from the subject. In order to realize such drive, the control circuit 6 of FIG. 13 is constructed to be connected to the reading circuit 2 and further to output a light-source control signal to the light source 8 to control on/off of light. In the present embodiment the control circuit 6 composes the control means.

First, in the "temperature detection mode," the temperature of photoelectric conversion element and TFT is detected by the following steps.

Figure 14:
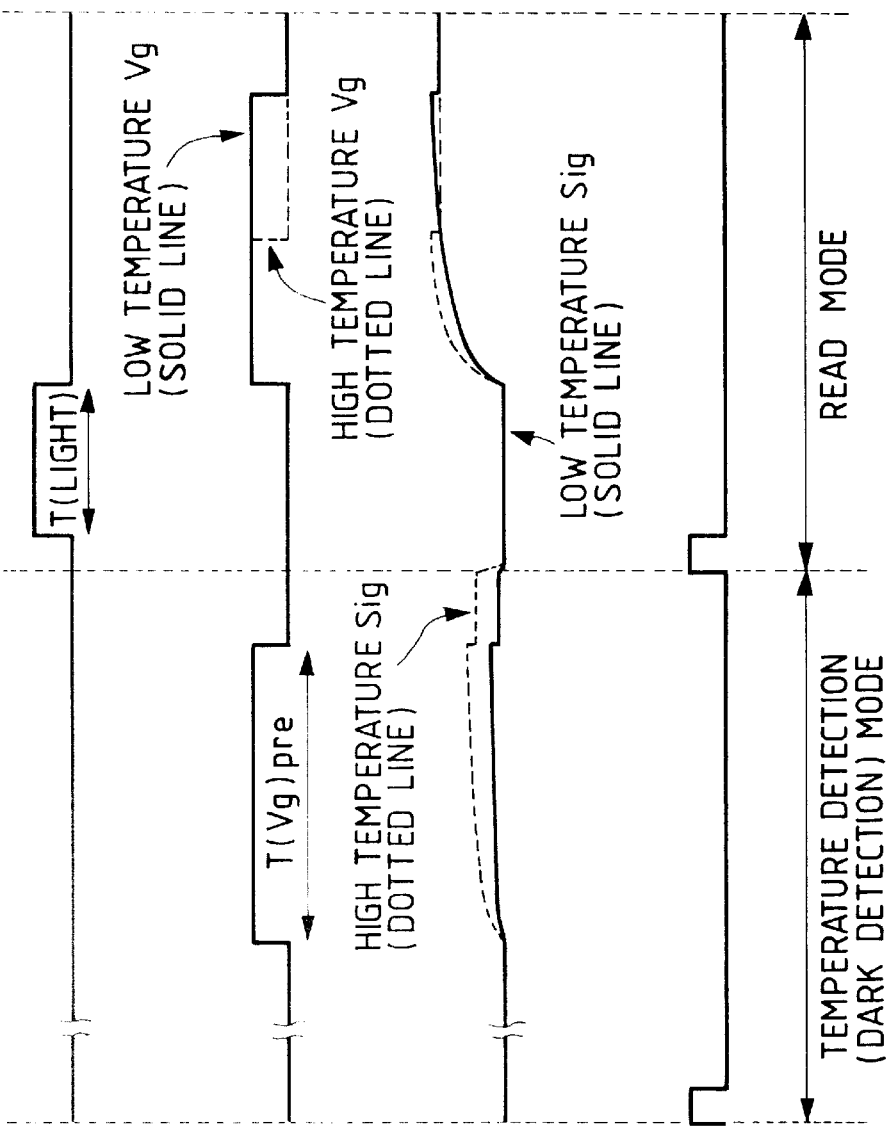
FIGS. 14A, 14B, 14C and 14D are timing charts for explaining an example of drive of the photoelectric conversion apparatus.

(1) The control circuit 6 supplies the light-source control signal to the light source 8 to shut light off as shown in FIG. 14A. Then the photoelectric conversion element is kept in the dark state.

(2) In the dark state the photoelectric conversion element S1 is made to accumulate the charge due to the dark current for a constant period.

(3) The gate of TFT is turned on for the period of T(Vg)pre as shown in FIG. 14B to read the charge due to the dark current by the reading circuit 2. The dark current of photoelectric conversion apparatus has the temperature dependence as shown in FIG. 5.

Accordingly, as shown in FIG. 14C, the quantity of accumulated charge is greater at a high temperature (the dotted line in the drawing) while it is smaller at a low temperature (the solid line in the drawing). Namely, the output signal in the dark period can be utilized as a temperature signal.

(4) The output signal in the dark period obtained in above (3) is supplied to the control circuit 6. The control circuit 6 determines the temperature of photoelectric conversion element, based on the magnitude of the output signal.

Next, the "read mode" is carried out by the following steps.

(1) The control circuit 6 outputs the light-source control signal to the light source 8 to illuminate the subject for the period of T(Light). The charge according to the information light from the subject is accumulated in the photoelectric conversion element S1.

(2) According to the temperature determined in the foregoing "temperature detection mode" by the control circuit 6, the gate driving circuit 3 applies the gate pulse adjusted as follows to the gate electrode of TFT T1.

high temperature→short gate on low temperature→long gate on (3) By on of TFT T1, the charge accumulated in the photoelectric conversion element S1 due to the information light of subject is transferred to the reading circuit 2 to be output as an analog image signal Sig (FIG. 14C).

By such an arrangement that the temperature of photoelectric conversion apparatus is detected in the "temperature detection mode" and the on time of the gate of TFT is changed according to the temperature in the "read mode" as described above, it becomes possible to realize the photoelectric conversion apparatus that is little influenced by the dark current of photoelectric conversion element while assuring sufficient charge transfer efficiency of TFT.

In this case, the temperature detection mode needs to be performed before (or after) reading, but there is no need for provision of a separate temperature sensor and the information about the temperature of the element itself can be attained.

Figure 6A:
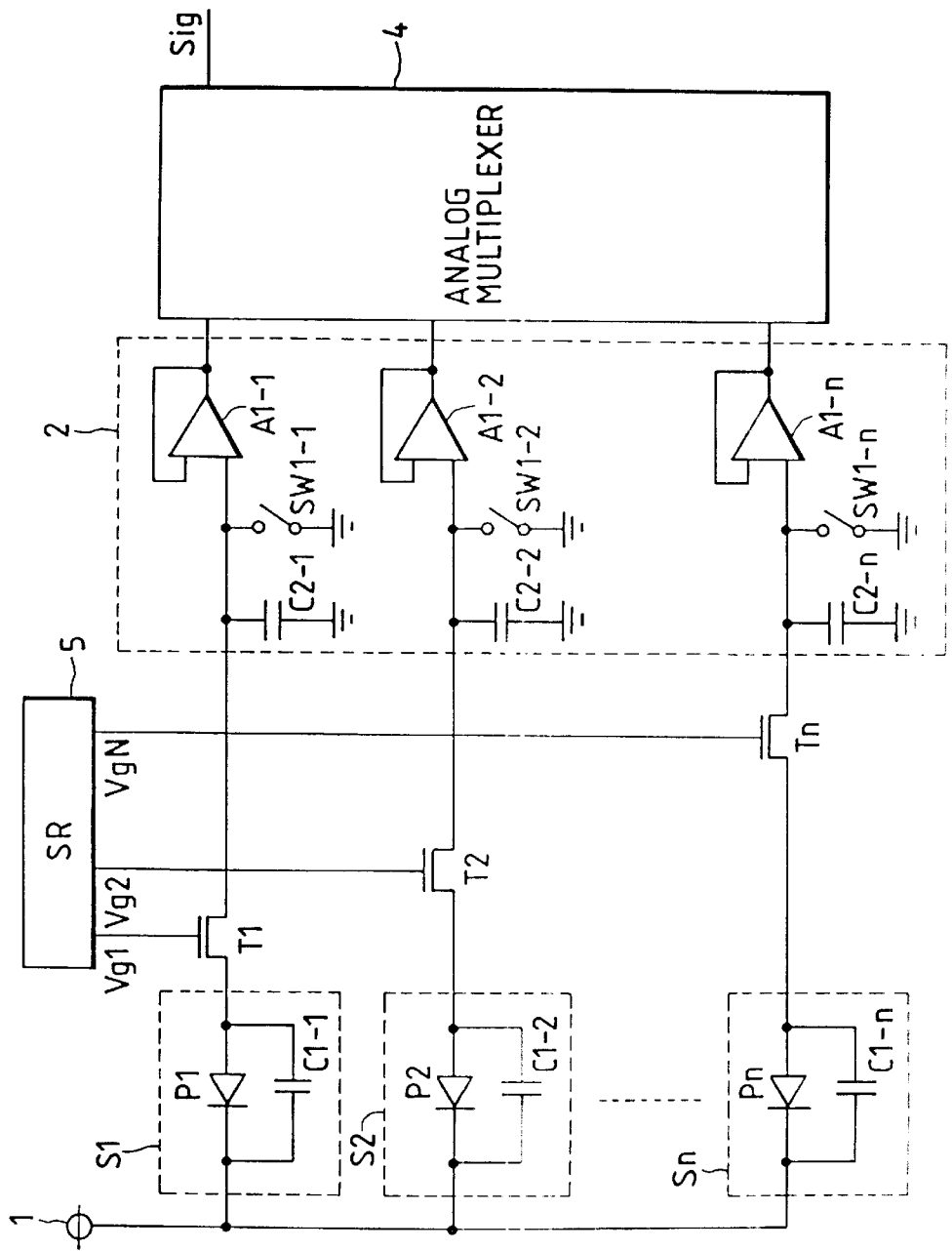
FIG. 6A is a schematic circuit diagram of the photoelectric conversion apparatus.
Figure 15:
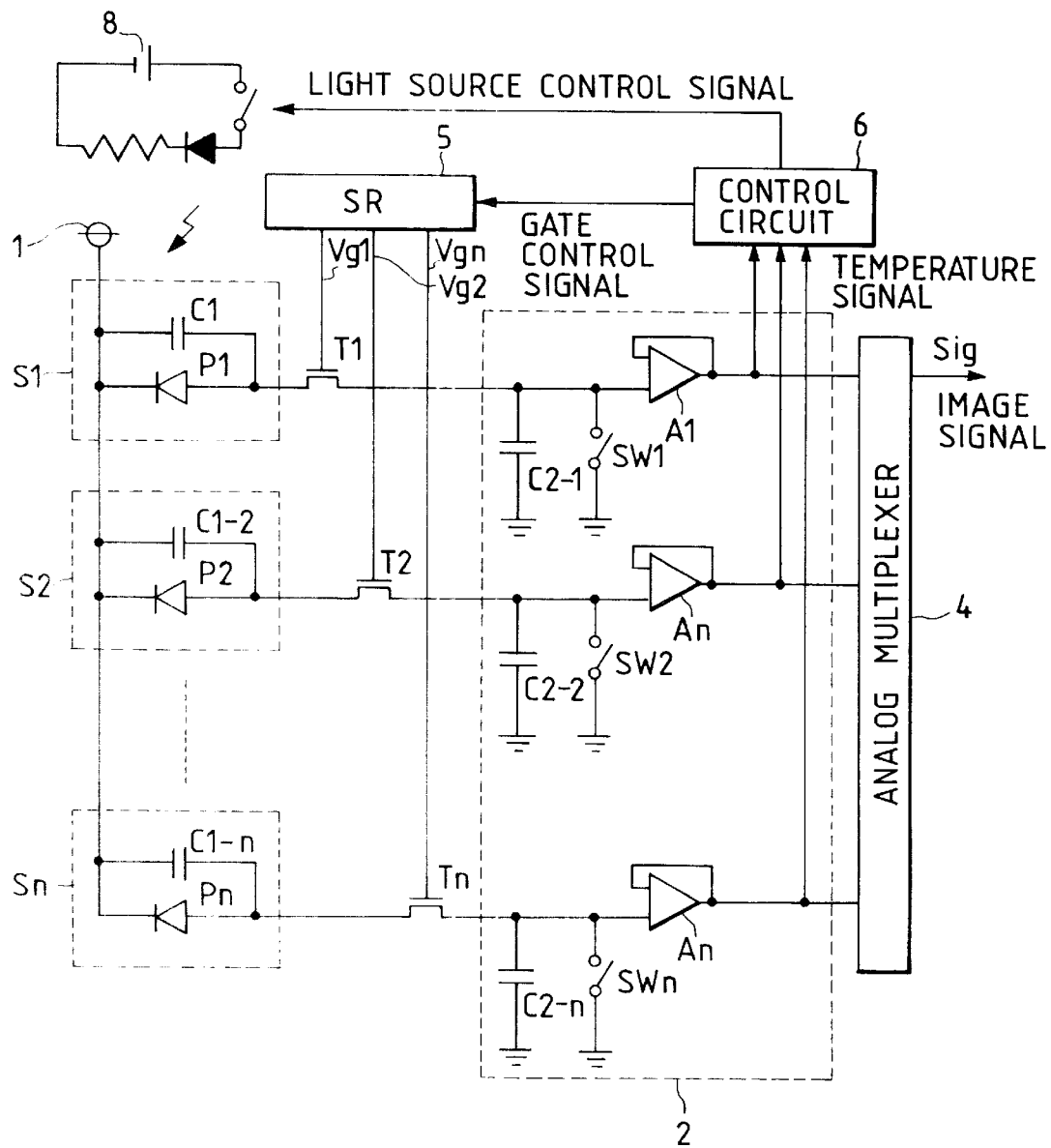
FIG. 15 is a schematic circuit diagram of a photoelectric conversion apparatus.

FIG. 15 is a schematic circuit diagram of a photoelectric conversion apparatus having a plurality of photoelectric conversion elements S1 to Sn. In the present embodiment, S1 to Sn and T1 to Tn are many photoelectric conversion elements and TFTs arrayed one-dimensionally or two-dimensionally. The shift register 5 is connected to the gate electrode of each TFT and the output from each pixel is connected to the analog multiplexer 4. Thus, the outputs from the pixels are successively selected to be output as image signals Sig. In FIG. 15, the elements having the same functions as those in FIG. 13 and FIG. 6 are denoted by the same symbols.

In the present embodiment the temperature is detected by reading the charge accumulated in the dark period in each photoelectric conversion element S1 to Sn and the on time of the gate of each TFT T1 to Tn is changed according thereto, as described above. The on time of the gate of each TFT may be different one from another. The temperature signal input to the control circuit 6 may be an output from each Amp of reading circuit 2 as shown in FIG. 15 or an output from the analog multiplexer 4. This is designed as occasion demands.

(Fourth Embodiment)

Next described is an example of operation of a photoelectric conversion apparatus of the present embodiment, using FIG. 16, FIG. 17, FIG. 18, FIG. 19 and FIGS. 20A to 20C.

Figure 16:
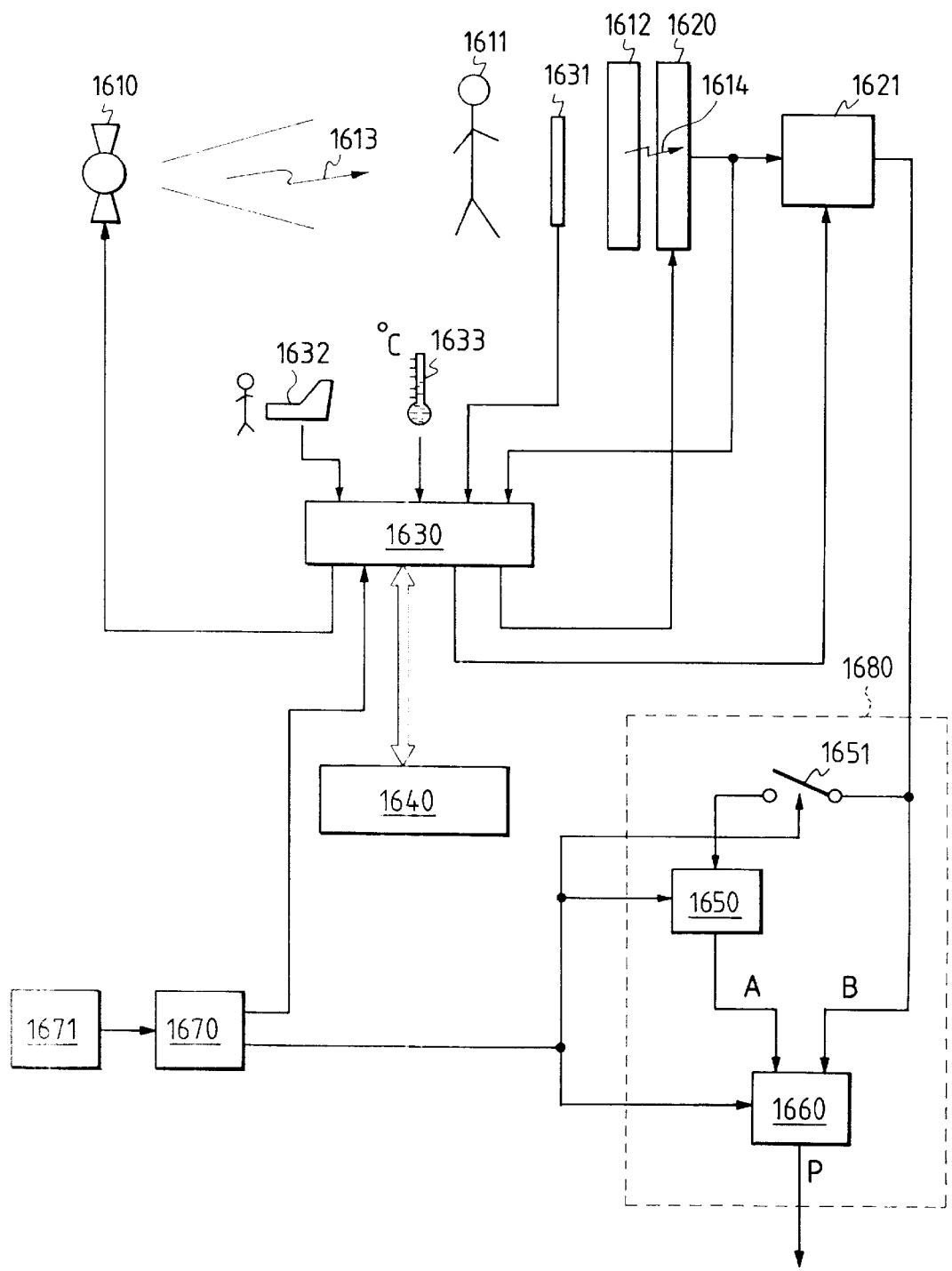
FIG. 16 is a schematic system structural diagram of an imaging apparatus.

FIG. 16 is a total system block diagram of an imaging apparatus according to still another embodiment of the present invention. The present embodiment is constructed as a radiation imaging apparatus that can be used for medical X-ray diagnosis and non-destructive examination. In FIG. 16, reference numeral 1610 designates an X-ray source that can emit X-rays 1613 on a pulsed basis and an AE controller 1630 serving as a photographing condition control means controls on/off of X-ray pulse, and the tube voltage and tube current of a tube in the X-ray source. The X-rays 1613 emitted from the X-ray source 1610 pass through the subject (detected body) 1611 being a patient or a body as an object to be diagnosed or examined and the passing X-rays are incident to a fluorescent body 1612 comprised of CsI, $Gd_2O_2S$, or the like. At this time the X-rays passing through the subject 1611 are transmitted in different quantities depending upon the size and shape of bones and viscera inside the subject 1611, upon presence or absence of focus, or upon differences of materials of constituent members, and they include image information thereof. The X-rays 1613 are converted to visible light by the fluorescent body 1612 and the visible light is incident as image information light 1614 to a two-dimensional area sensor 1620 acting as an imaging means. The two-dimensional area sensor 1620 has a plurality of photoelectric conversion elements arrayed two-dimensionally and a driving circuit for driving them, and converts the image information light 1614 to an electric signal including two-dimensional information. The two-dimensional area sensor 1620 is controlled in the accumulation time of signal and in the drive speed by the AE controller 1630. The output from the two-dimensional area sensor 1620 is supplied to a gain adjusting circuit 1621 and also as information for controlling the photographing conditions to the AE controller 1630.

The AE controller 1630 also receives supply of outputs from a control panel 1632, a temperature sensor 1633, and a phototimer 1631 in order to control the photographing conditions. The control panel 1632 has such an arrangement that the doctor or technical expert manipulates the panel to input conditions to achieve an optimum photographic output every photographing exposure in consideration of symptom, conformation, and age of patient, the size and thickness of object, or information desired to obtain and that the conditions are converted to an electric signal to be input into the AE controller 1630. The temperature sensor 1633 detects the temperature of a room upon photographing exposure, the temperature of the tube, and the temperature of components which change characteristics and optimum operating conditions depending upon the temperature, such as the two-dimensional area sensor 1620, and supplies the temperatures to the AE controller 1630. These detected temperatures are preferably those at the time of just photographing exposure. The phototimer 1631 is located, for example, at an arbitrary position between the subject 1611 and the two-dimensional area sensor 1620, detects the quantity of X-rays passing through a reference portion (for example, an alveolar portion) of the subject 1611 during photographing exposure, and supplies it to the AE controller 1630. Since the phototimer 1631 absorbs little X-rays, it rarely negatively affects the photographing exposure. The AE controller 1630 automatically controls and sets the X-ray pulse width of the X-ray source 1610, the accumulation time and drive speed of the two-dimensional area sensor 1620, and the amplification factor of the gain adjusting circuit 1621, based on values of these inputs immediately before the photographing exposure or values thereof during the photographing exposure. These controls permit the output from the gain adjusting circuit 1621 to be set to an appropriate photographing output.

Also, the control and set conditions upon the photographing exposure by the AE controller 1630 can be stored as condition values in a condition memory circuit 1640 serving as a condition storing means at this time. This condition memory circuit 1640 can store the conditions and can also supply the condition values stored to the AE controller 1630. At this time the AE controller 1630 can control and set the X-ray source 1610, two-dimensional area sensor 1620, and gain adjusting circuit 1621, based on the condition values supplied from the condition memory circuit 1640, to operate them. This means that a photographing exposure can be performed again under the same control and setting as the past photographing exposure conditions. On this occasion part of conditions, and control and setting can be changed to perform corrected exposure, whereby the output from the gain adjusting circuit 1621 can be a corrected output. Namely, when the system operates under the same conditions as upon the previous photographing exposure except for no emission of X-ray pulse, a correction output of the dark-time output of the two-dimensional area sensor 1620 can be obtained.

In FIG. 16, a block inside the dashed line of 1680 indicates a correction circuit, in which a frame memory 1650 as a photographing output storing means can record a photographing output obtained upon photographing exposure once through a switch 1651 and in which an arithmetic process circuit 1660 can process the photographing output with correction output B obtained upon correction exposure and photographing output A stored in the frame memory 1650 to obtain an image information output P excluding errors upon photography. This image information output P is transmitted to an image processing system or the like.

Numeral 1670 is a system control circuit, which detects depression of switch SW1 or switch SW2, controls the X-ray source 1610, two-dimensional area sensor 1620, and gain adjusting circuit 1621 through the AE controller 1630, though not illustrated, to perform photographing exposure or correction exposure, and controls the switch 1651, frame memory 1650, and arithmetic process circuit 1660 to operate them as the correction circuit 1680.

Figure 17:
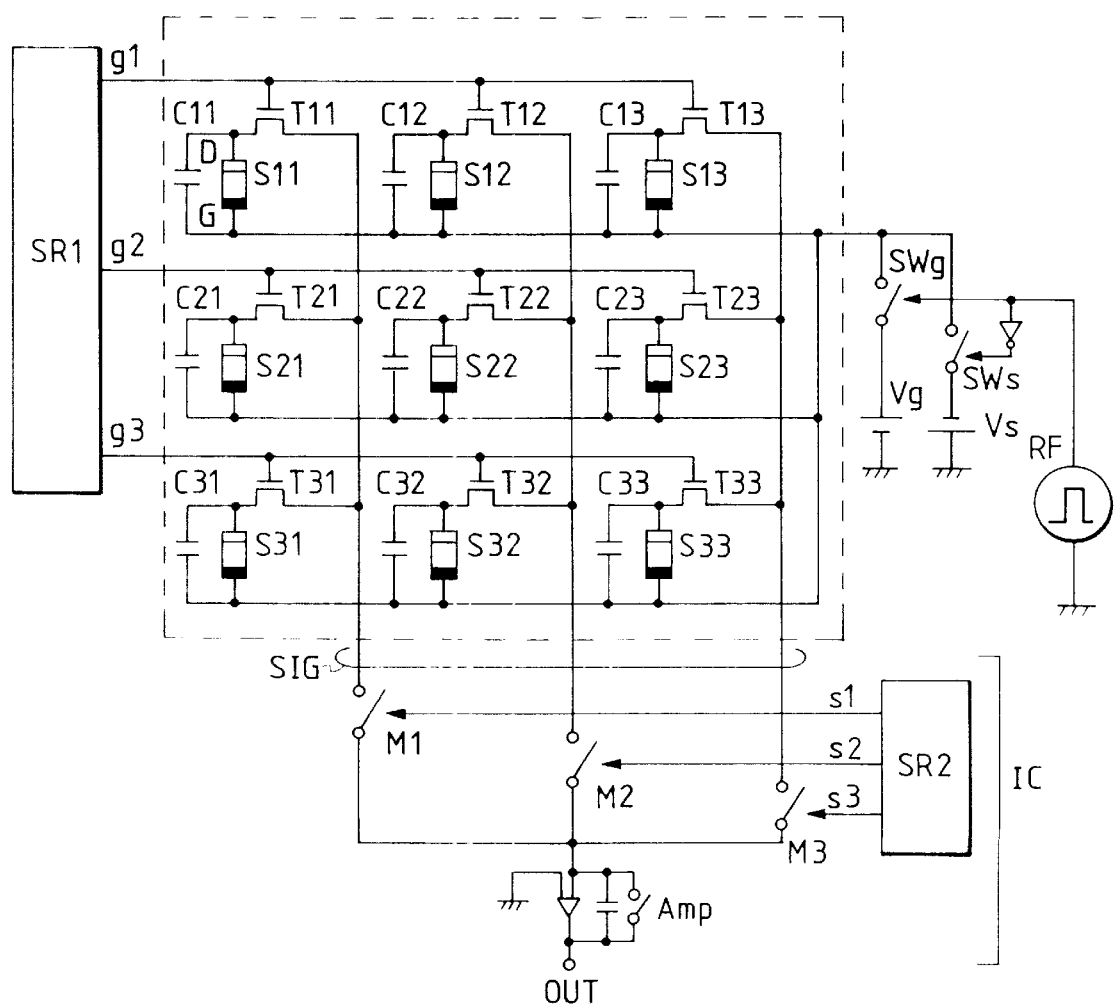
FIG. 17 is a schematic circuit diagram of a photoelectric conversion apparatus.

FIG. 17 is a schematic total circuit diagram to show an example of the configuration of the two-dimensional area sensor 1620. In FIG. 17, S11 to S33 indicate photoelectric conversion elements the lower electrode side of which is denoted by G and the upper electrode side of which by D. C11 to C33 denote capacitors for accumulation and T11 to T33 TFTs for transmission. Vs is a reading power supply and Vg a refreshing power supply. Each power supply is connected through a switch SWs, SWg to the G electrodes of the all photoelectric conversion elements S11 to S33. The switch SWs is connected through an inverter to a refresh control circuit RF and the switch SWg is also connected to the refresh control circuit RF. Swg is on during a refresh period while SWs is on during the other periods. A pixel is comprised of one photoelectric conversion element, one capacitor, and one TFT and a signal output thereof is connected to a detection integrated circuit IC by signal wire SIG. The two-dimensional area sensor of the present embodiment is comprised of three blocks including nine pixels in total, it simultaneously transmits outputs of three pixels per block, and the detection integrated circuit receives the outputs through the signal wires to convert them to outputs in order and output them. Further, the three pixels in one block are arranged horizontally and the three blocks are arranged vertically in order, thereby arranging the pixels two-dimensionally.

In the drawing the portion surrounded by the dashed line can be formed on a same insulating substrate of a large area.

Figure 18:
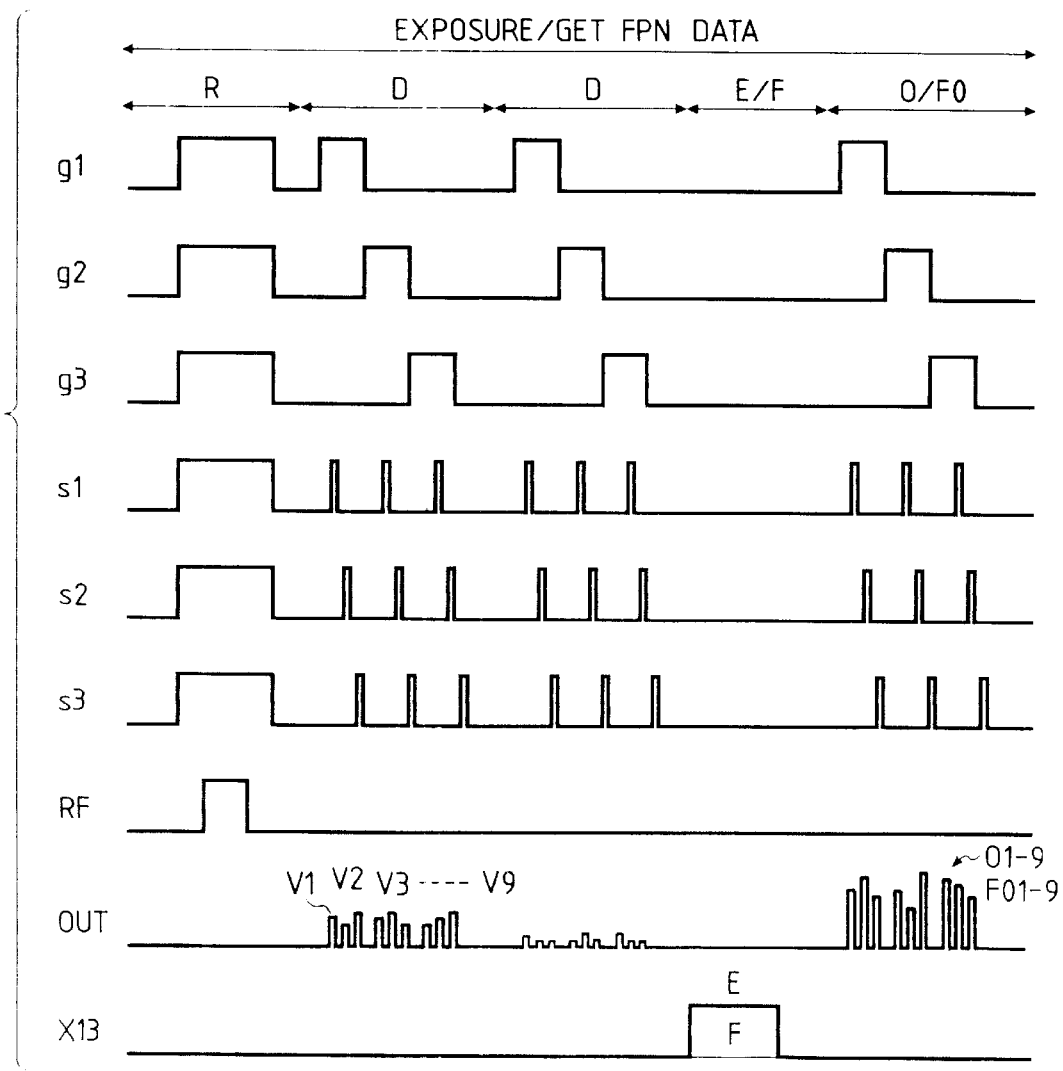
FIG. 18 is a timing chart for explaining an example of drive of the photoelectric conversion apparatus.

FIG. 18 is a timing chart to show the reading operation of optical information and the data reading operation for FPN correction in the exposure mode of the present embodiment. First described is the reading operation [Exposure] of optical information.

First, the system control circuit 1670 subjects the two-dimensional area sensor 1620 to the refresh operation expressed by R in the upper part in FIG. 18. The refresh operation is described here. Shift registers SR1 and SR2 shown in FIG. 17 first apply Hi to the control wires g1 to g3 and s1 to s3. Then the transferring TFTs T11 to T33 and switches M1 to M3 become on to let the current flow and to change the D electrodes of the all photoelectric conversion elements S11 to S33 to the GND potential (because the input terminal of integration detector Amp is designed to take the GND potential herein). At the same time, the refresh control circuit RF outputs Hi to turn the switch SWg on and the refreshing power supply Vg changes the G electrodes of the all photoelectric conversion elements S11 to S33 to a positive potential. Then the all photoelectric conversion elements S11 to S33 go into the refresh mode to be refreshed. Then the refresh control circuit RF outputs Lo to turn the switch SWs on and the reading power supply Vs changes the G electrodes of the all photoelectric conversion elements S11 to S33 to a negative potential. Then the all photoelectric conversion elements S11 to S33 go into the photoelectric conversion mode and the capacitors C11 to C33 are initialized at the same time. In this state the shift registers SR1 and SR2 apply Lo to the control wires g1 to g3 and s1 to s3. Then the transferring TFTs T11 to T33 and switches M1 to M3 become off, and the D electrodes of the all photoelectric conversion elements S11 to S33 become open on a DC basis, but the potential is maintained by the capacitors C11 to C33. However, since no X-rays are incident at this point, no light is incident to any photoelectric conversion elements S11 to S33, so that no photocurrent flows therein. This completes the refresh operation (R).

Next, the two-dimensional area sensor 1620 performs dummy reading operation expressed by D in the upper part in FIG. 18. The reason thereof is that the dark current also flows because of the change of the G electrodes of photoelectric conversion elements S11 to S33 from the same reason as the dark current flows upon on of bias application thereto as described in the previous example. This current, however, can be decreased to some extent by the potential and direction of the refreshing power supply Vg and the pulse width of Hi of RF, when compared with the electric current flowing upon application of bias from the electric field of 0. Since the dark current is not zero completely, execution of dummy reading will decrease the dark current by a small Wait effect. This operation is equivalent to charge reading of optical information described hereinafter. The shift register SR1 applies the control pulse of Hi to the control wire g1 and the shift register SR2 applies the control pulse to the control wires s1 to s3, whereby v1 to v3 are successively output through the transmitting TFTs T11 to T13 and switches M1 to M3. Similarly, by control of the shift registers SR1, SR2, charges of the other photoelectric conversion elements are also output up to v9 in order (OUT). However, these outputs of v1 to v9 are not used. The outputs are not used in this dummy reading operation. This dummy reading has a role of resetting the charges due to the dark current with change of the G electrodes of photoelectric conversion elements S11 to S33 described previously and has the same effect as Wait for waiting for damping of this dark current. Therefore, the negative effect of the dark current can be decreased by increasing the number of dummy readings. Also taking operability into consideration, the present embodiment is arranged to perform this dummy reading twice.

After that, irradiation of X-ray pulse expressed by E in FIG. 18 is carried out (X13). At this time the two-dimensional area sensor 1620 keeps the transferring TFTs T11 to T33 off. In this state the X-ray source 1610 emits the X-ray pulse 1613. Then a photocurrent flowing due to light of a certain determined quantity is accumulated as a charge in each of the capacitors C11 to C33, and the charges are maintained even after the end of incidence of X-rays.

Then carried out is reading of the charges including optical information as expressed by O1-9 (OUT). The operation of the two-dimensional area sensor 1620 is the same as in the dummy reading, but the outputs thereof include optical information, i.e., two-dimensional information of internal structure of the detected body such as the human body, which are denoted by O1-9. As described, the exposure operation [Exposure] of the two-dimensional area sensor 1620 of the present embodiment is a combination of operations of initialization—dummy reading—dummy reading—exposure—reading (R-D-D-E-O) when expressed finely.

In contrast with it, the FPN correction data reading operation indicated by [Get FPN Data] in Exposure Mode upon setting in the exposure mode includes the same operations as the reading operation of optical information [Exposure] and the operation of two-dimensional area sensor 1620. However, X-rays are not emitted as shown by F in X13. The operation at this time is expressed by F and the operation for outputting outputs FO1-9 including information of FPN by FO. Namely, the FPN correction data reading operation indicated by [Get FPN Data] is a combination of operations of initialization—dummy reading—dummy reading—non-exposure state—reading (R-D-D-F-FO).

Figure 19:
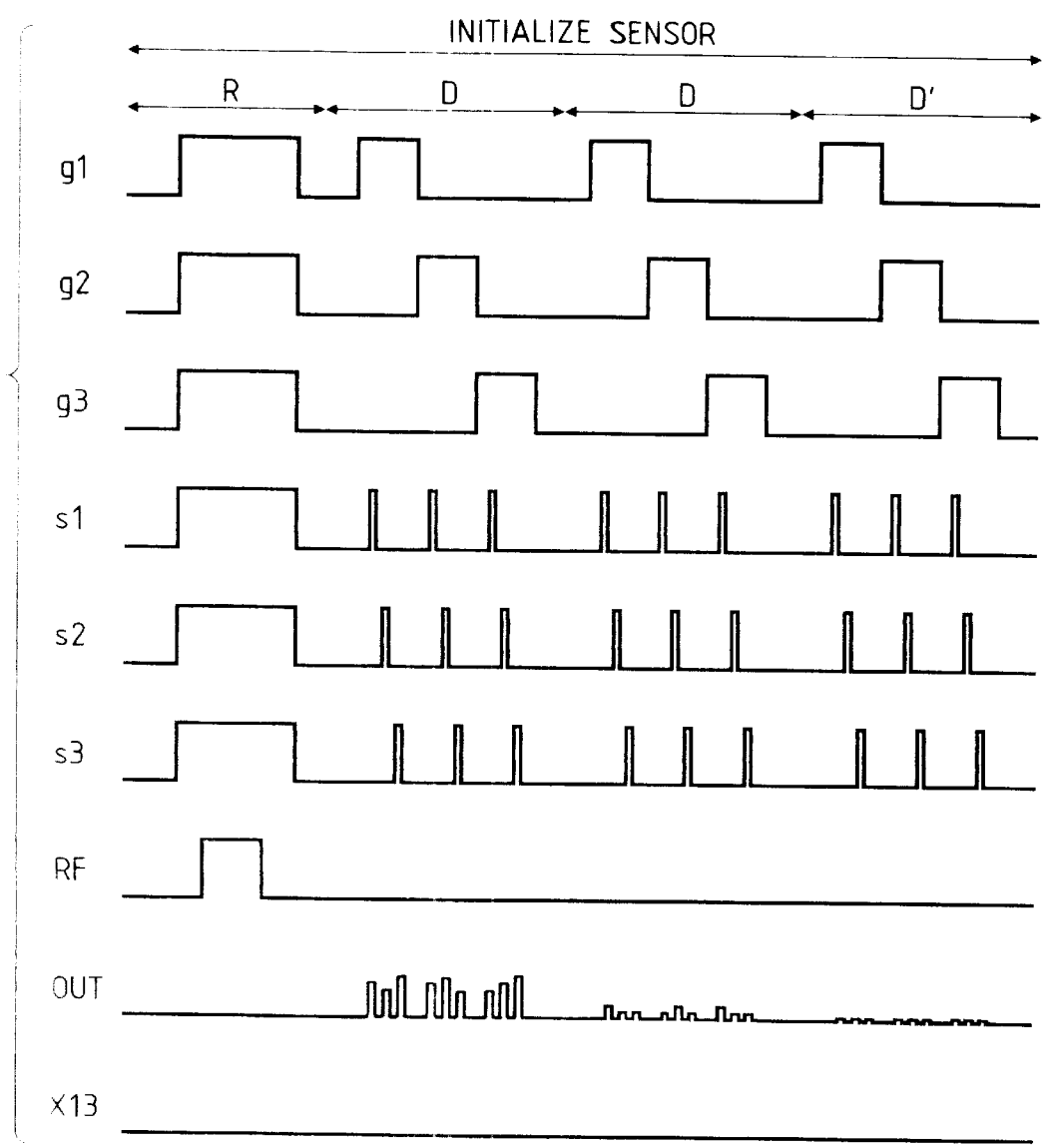
FIG. 19 is a timing chart for explaining an example of initialization of photoelectric conversion element.

FIG. 19 shows an example of the initialization operation [Initialize Sensor] in the standby mode. The operation is the same as the exposure operation [Exposure] of FIG. 18 except for absence of the X-ray pulse irradiation period E. The outputs are not used, either. The initialization operation indicated by [Initialize Sensor] is a combination of operations of R-D-D-D'. This initialization operation is not carried out only once, but can also be repeated periodically several times, which can reset unnecessary charges due to the dark current flowing in the photoelectric conversion elements, thereby making a good condition upon next exposure operation. It is thus preferable that in the standby mode this initialization operation be carried out periodically so as to reset the charges of photoelectric conversion elements periodically.

Figures 20A, 20B, 20C:
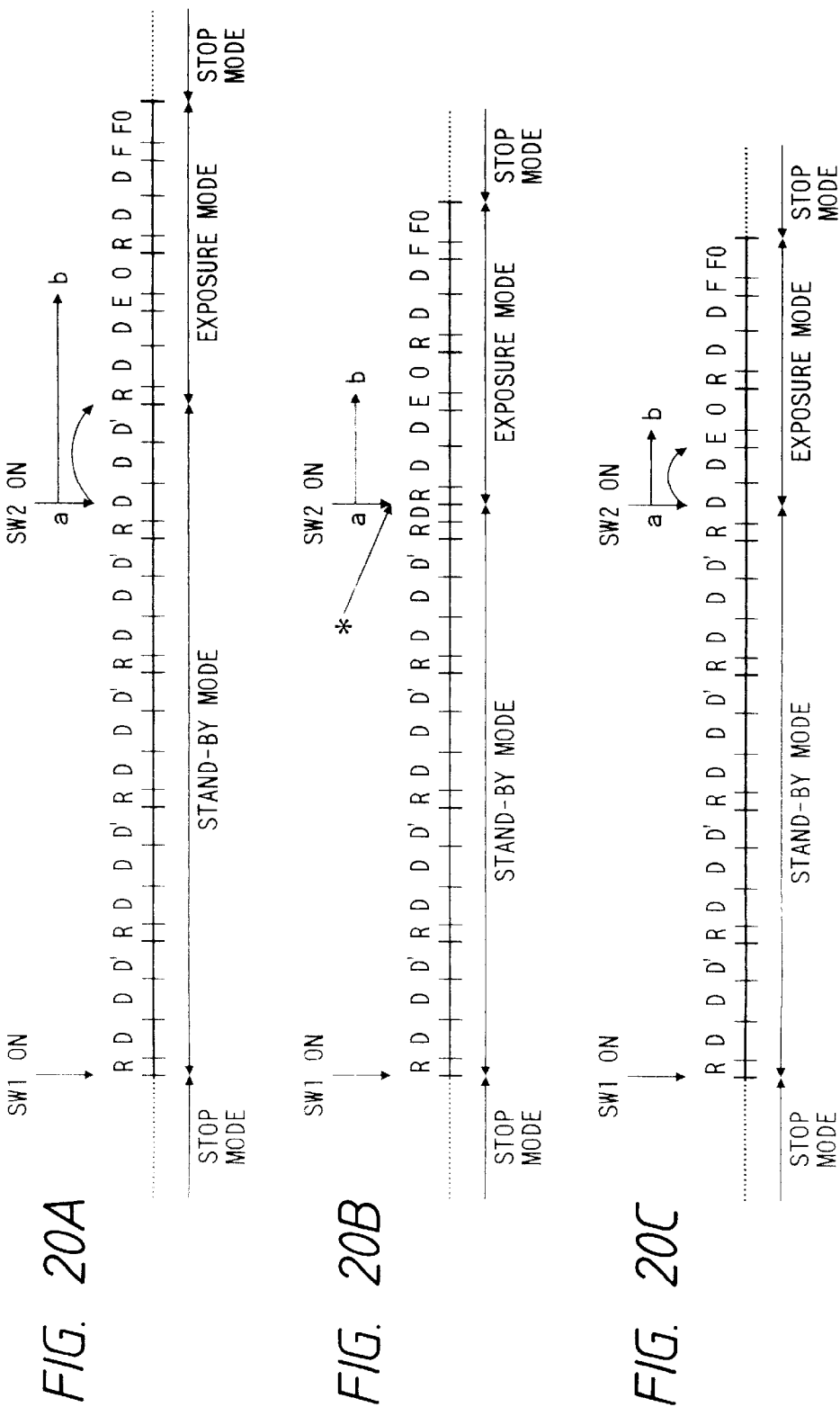
FIGS. 20A, 20B and 20C are schematic operation explanatory drawings for explaining an example of drive of the photoelectric conversion apparatus.

Now, an example of the operation of the entire system of the present embodiment is described referring to FIG. 16, FIG. 17, and FIG. 20A to FIG. 20C. Three types of operations of the two-dimensional area sensor 1620, for example, as shown in FIG. 20A, FIG. 20B, and FIG. 20C, are typically considered. The operation of FIG. 20A is described first. For the non-operative period the two-dimensional area sensor 1620 is in the stop mode and no electric field is applied to the photoelectric conversion elements. First, the doctor or technical expert positions the detected body as an object of examination, i.e., the subject 1611 between the X-ray source 1610 and the two-dimensional area sensor 1620 and makes the subject pose or located so as to permit observation of a portion desired to examine. When the pose or location is almost set, SW1 in the switch box 1671 is turned on. Then the two-dimensional area sensor 1620 transfers to the standby mode. At the same time, conditions are input through the control panel 1632 so as to obtain an optimum photographing output, taking account of the symptom, conformation, and age of patient obtained by doctor's questions or the like, the composition and size of object, or information of detected body desired to obtain. This signal is an electric signal, which is transmitted to the AE controller 1630. At the same time, these conditions are stored in the condition memory circuit 1640.

When in this state the doctor or technical expert depresses SW2 in the switch box 1671 after confirming on of [READY lamp] in the control panel 1632, the end of the initialization operation [Initialize Sensor] under way at that time is awaited and after completion thereof the system goes into the exposure mode to start the exposure operation [Exposure] first. At this time the temperature sensor 1633 detects the temperature of the room upon photographing exposure, the temperature of the tube, and the temperature of the components that change characteristics depending upon the temperature to change the optimum operation conditions, such as the two-dimensional area sensor 1620, and it supplies them to the AE controller 1630. These detected temperatures are just those immediately before execution of photographing exposure. At the same time, these temperatures are stored as conditions in the condition memory circuit 1640.

Here, the AE controller 1630 determines the initial conditions in the exposure operation, based on the information from the control panel 1632 and the information from the temperature sensor 1633. At the same time, these initial conditions are stored in the condition memory circuit 1640. The contents of the initial conditions include the voltage, current, and maximum pulse width of the tube of the X-ray source 1610, and the drive speed of the two-dimensional area sensor 1620. For example, if the chest or a thick part of the object is set through the control panel 1632, the voltage of the tube of the X-ray source 1610 will be set high; if the abdomen or a thin part of the object is set, it will be set low. If the control panel 1632 instructs that the patient is a child or a pregnant woman or a structural material possibly affected by X-rays, the end condition by the phototimer 1631 will be set short and the maximum pulse width will also be set narrow. If the temperature of the two-dimensional area sensor 1620 is high, the optimum conditions will be set so as to increase the drive speed to lower accumulation of dark current and to prevent lowering of S/N, because the dark current of photoelectric conversion element is high and because the performance of TFT is high. Conversely, if the temperature is low, the drive speed will be lowered to suppress deformation of image due to decrease of transfer of charges of TFT, because the performance of TFT is low and because the dark current of photoelectric conversion element is also low.

Under such initial conditions the X-rays are emitted at the timing E in FIG. 20A to FIG. 20C and pass through the subject 1611 to enter the fluorescent body 1612. Then the X-rays are converted to light and the light is incident to the respective photoelectric conversion elements S11 to S33. At the same time, the X-rays are also incident to the phototimer 1631 positioned between the subject 1611 and the two-dimensional area sensor 1620. These beams of light include information of the internal structure of the human body or the like. The output from the phototimer 1631 is input to the AE controller 1630 at all times. When integral of the output exceeds a constant value determined by the initial conditions, the AE controller 1630 stops the X-rays. This results in obtaining an optimum exposure dose in the exposure operation. If the maximum pulse width determined by the initial conditions is achieved, the AE controller 1630 will stop the X-rays independently of the photosensor 1631. At this time the condition memory circuit 1640 stores the pulse width of actually emitted pulse as an exposure time.

The outputs O1-9 including optical information at this time are put into the gain adjusting circuit 1621 and also into the AE controller 1630. The AE controller 1630 always determines the gain for converting these outputs to appropriate values, makes the condition memory circuit 1640 store that value of gain, and, at the same time, gives it to the gain adjusting circuit 1621. This changes the output of the gain adjusting circuit 1621 to an optimum photographing output for processing them later. This photographing output is once recorded in the frame memory 1650 as a photographing output storing means through the switch 1651 controlled by the system control circuit 1670.

As described above, the AE controller 1630 automatically controls the X-ray source 1610, two-dimensional area sensor 1620, and gain adjusting circuit 1621 almost in real time, based on setting and outputs of the control panel 1632, temperature sensor 1633, phototimer 1631, and two-dimensional area sensor 1620, so that it can attain the photographing output under various conditions almost optimal. This completes the exposure operation.

Next, the system control circuit 1670 enters the FPN correction data reading operation to subject the two-dimensional area sensor 1620 again to the refresh operation and dummy reading. At the same time, the system control circuit 1670 calls the various conditions stored in the condition memory circuit 1640 upon the exposure operation into the AE controller 1630. The components other than the X-ray source 1610 are operated under the exactly same conditions as upon the exposure operation. Namely, they are operated based on the values stored in the condition memory circuit 1640 without using the outputs from the temperature sensor 1633 and from the phototimer 1631. The X-ray source 1610 is not operated in the correction mode so as to emit no X-rays. However, though the X-ray source 1610 is not operated, the two-dimensional area sensor 1620 starts the reading operation after waiting for a period corresponding to the exposure time in the photographing mode. The drive speed and the gain of gain adjusting circuit 1621 are the same as those in the photographing mode, thereby obtaining the outputs FO1-9 including information of FPN. The output of the gain adjusting circuit 1621 at this time is defined as a correction output. Namely, the correction output can be obtained by setting and controlling the X-ray source 1610, two-dimensional area sensor 1620, and gain adjusting circuit 1621 to the values stored in the condition memory circuit 1640.

This correction output is an output reflecting the electric current in the dark period (or in the non-irradiated period) of each pixel, the fixed pattern noise upon transfer, offset voltages of an internal amplifier of the two-dimensional area sensor 1620 and the gain adjusting circuit 1621, and so on. Since this correction output is of the same accumulation period as upon the exposure operation, an influence amount due to accumulation of current in the dark period is also the same. In addition, since this correction output is also of the same drive speed, an influence amount of fixed pattern due to influence of clock leak or the like is also the same. Further, since the gain is also the same, an influence amount of offset voltage is also the same. Namely, since the operations in the photographing mode and in the correction mode are completely the same except for the X-ray source thanks to the condition memory circuit 1640, all influence amounts not preferable for photography except for emission or non-emission of X-rays are the same, as well as the influence amounts described previously. Accordingly, the correction output includes only the unpreferred errors in the same amounts in the photographing output.

Therefore, letting A be the photographing output stored in the frame memory 1650 and B be the correction output obtained in the correction mode, the arithmetic process circuit 1660 performs a subtraction process to calculate P=A−B, thereby obtaining a good image information output P as removing the errors of fixed pattern and the like from the photographing output obtained in the photographing mode. For simplification of description, it was described with the simple equation (P=A−B) herein. It is thus noted that the method of correction is not limited to this, but may be modified with necessity.

The operation of transition from the standby mode through on of SW2 to the exposure mode may also be performed preferably by the other operation methods shown in FIG. 20B and FIG. 20C. FIG. 20B shows an example in which the initialization operation is forcibly stopped at the time (*) when SW2 becomes on and in which then the exposure operation is started. FIG. 20C shows an example in which unless the second dummy reading of initialization operation has been finished at the time of on of SW2, X-rays are emitted after completion of two dummy readings to effect the exposure operation. In the cases wherein the detected body such as the patient needs to stand still, the period thereof (between a and b) can be shorter in FIG. 20B than in FIG. 20A and shorter in FIG. 20C than in FIG. 20B. However, optimization with the other operations is easier and performance is easier to enhance in FIG. 20B than in FIG. 20C, and easier in FIG. 20A than in FIG. 20B, because the operation is carried out at the timing expected, independent of the timing of on of SW2, as to the transition. Namely, FIG. 20A includes the continuous initialization operation and exposure operation of the entire system, has no odd transient response, has the time margin in X-ray control, and permits an increase in the control number. FIG. 20B has the time margin in the X-ray control, permits an increase in the control number, and requires only a short time for stop of the detected body such as the patient. FIG. 20C includes the continuous initialization operation and exposure operation and no odd transient response in the panel operation and requires only a very short period for stop of the detected body such as the patient.

The two-dimensional area sensor of the present embodiment was described as the example wherein nine pixels were arranged in the two-dimensional array of 3×3, they were divided into three groups, and they were arranged so that outputs from each group of three pixels were simultaneously output and transmitted, but it is not limited to this example. For example, if 2000×2000 pixels are arranged two-dimensionally in the pixel size of 5×5 per 1 mm square, the two-dimensional area sensor of 40 cm×40 cm can be obtained and a radiation imaging apparatus can be constructed for the purposes of medical X-ray diagnosis and high-precision non-destructive examination. With such apparatus the output thereof can be displayed on a CRT momentarily, different from the film. Further, the output can be converted to a digital signal and then the digital signal can be subjected to image processing in a computer to be converted to any output depending upon the purpose. The data can also be stored in a storage means such as an optical disk or a magnetooptical disk, whereby a past image can be searched momentarily. In addition, clear images can also be obtained at higher sensitivity than that of the film and in a small X-ray dose little affecting the human body and environment.

By changing the driving condition of TFT according to the temperature information, the present embodiment can obtain image information of high S/N stably, irrespective of the ambient temperature.

(Fifth Embodiment)

Figure 21:
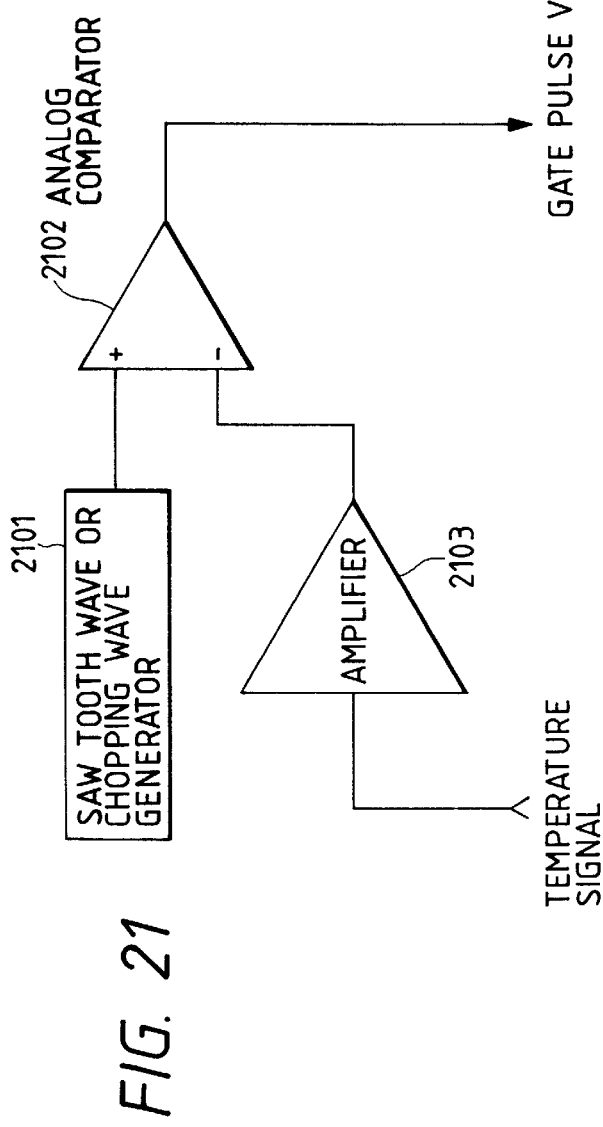
FIG. 21 is a schematic circuit structural drawing for explaining an example of a gate pulse control circuit.

Next described referring to FIG. 21 is an example of the circuit configuration that can be used for the above-stated control circuit or AE controller, or the gate driving circuit.

As shown in FIG. 21, the gate driving circuit has a saw tooth wave or chopping (triangular) wave generator 2101, analog comparator 2102, and an amplifier 2103 and a saw tooth wave or triangular wave from the saw tooth wave or chopping wave generator 2101 is input into one terminal of the analog comparator 2102. The signal carrying the temperature information (the temperature signal) is input to the amplifier 2103 and the amplifier supplies an amplified signal thereof to the other terminal of the analog comparator 2102. The analog comparator 2102 outputs a signal (gate pulse Vg) of a pulse width changed based on the input signal. Namely, the pulse width of the gate drive pulse is changed according to the temperature. This will be described using FIG. 22.

Figure 22:
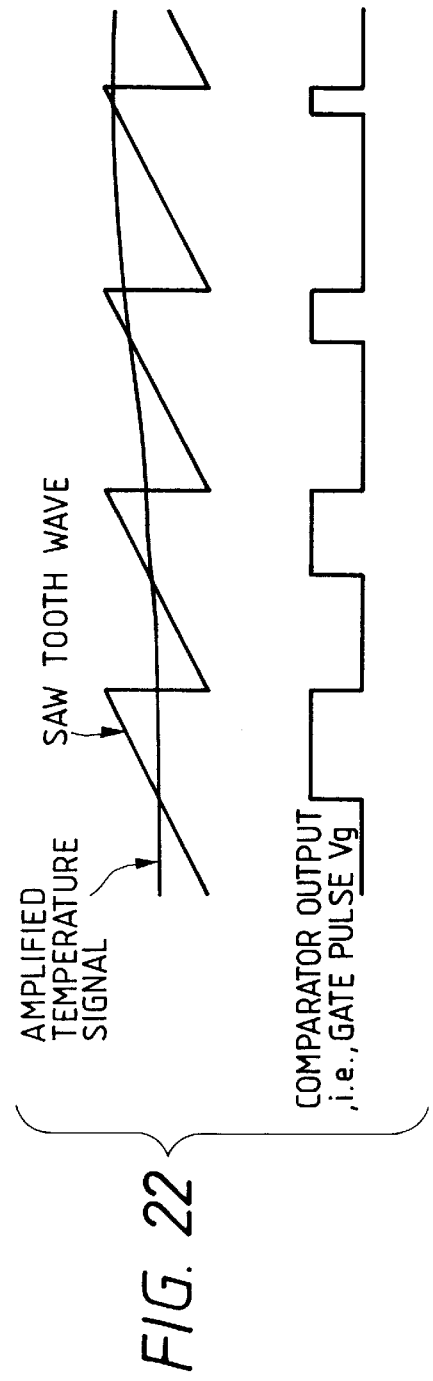
FIG. 22 is a drawing for explaining an example of each output waveform.

FIG. 22 shows that the output (the saw tooth wave herein) from the saw tooth wave or chopping wave generator 2101 is output in a constant period. The amplified temperature signal is indicated by the dotted line and the gate pulse width is defined as an interval between intersecting points of the amplified temperature signal with the saw tooth wave and in the region where the output of the saw tooth wave is greater than the output of the amplified temperature signal. Accordingly, the output of amplified temperature signal becomes higher with increase of temperature (on the right side in the figure), eventually decreasing the gate pulse width.

It becomes possible to output an optimum gate drive pulse by properly adjusting the amplitude and period of the saw tooth wave or the amplification factor of temperature signal.

Next described briefly is an example of the above-stated photoelectric conversion elements and a system using the elements. Of course, the photoelectric conversion elements are not limited to the above-stated or below-stated elements, and the system can also be modified as occasion demands.

Figure 23:
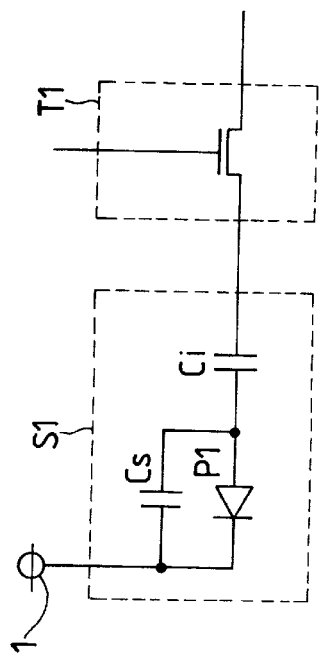
FIG. 23 is a schematic equivalent circuit diagram of one pixel in a photoelectric conversion section.
Figure 24:
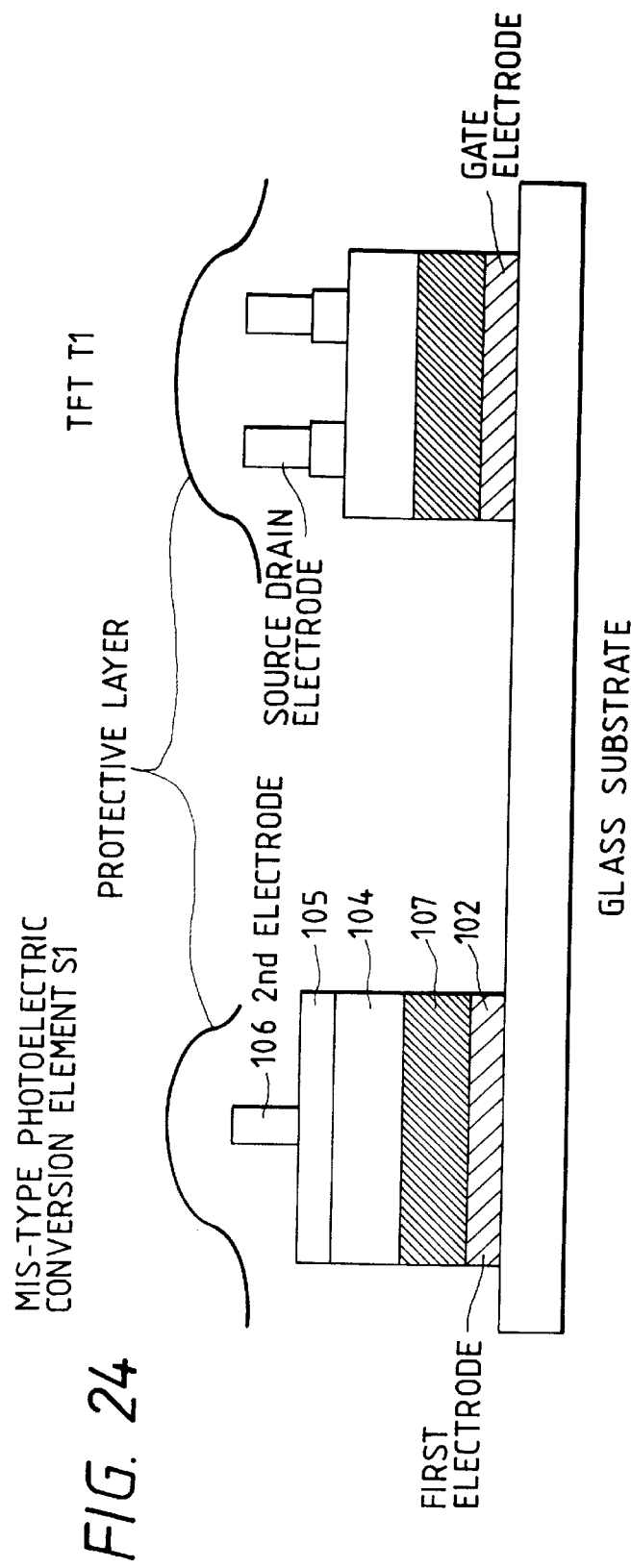
FIG. 24 is a schematic cross-sectional view for explaining an element configuration of one pixel in the photoelectric conversion section.
Figure 25:
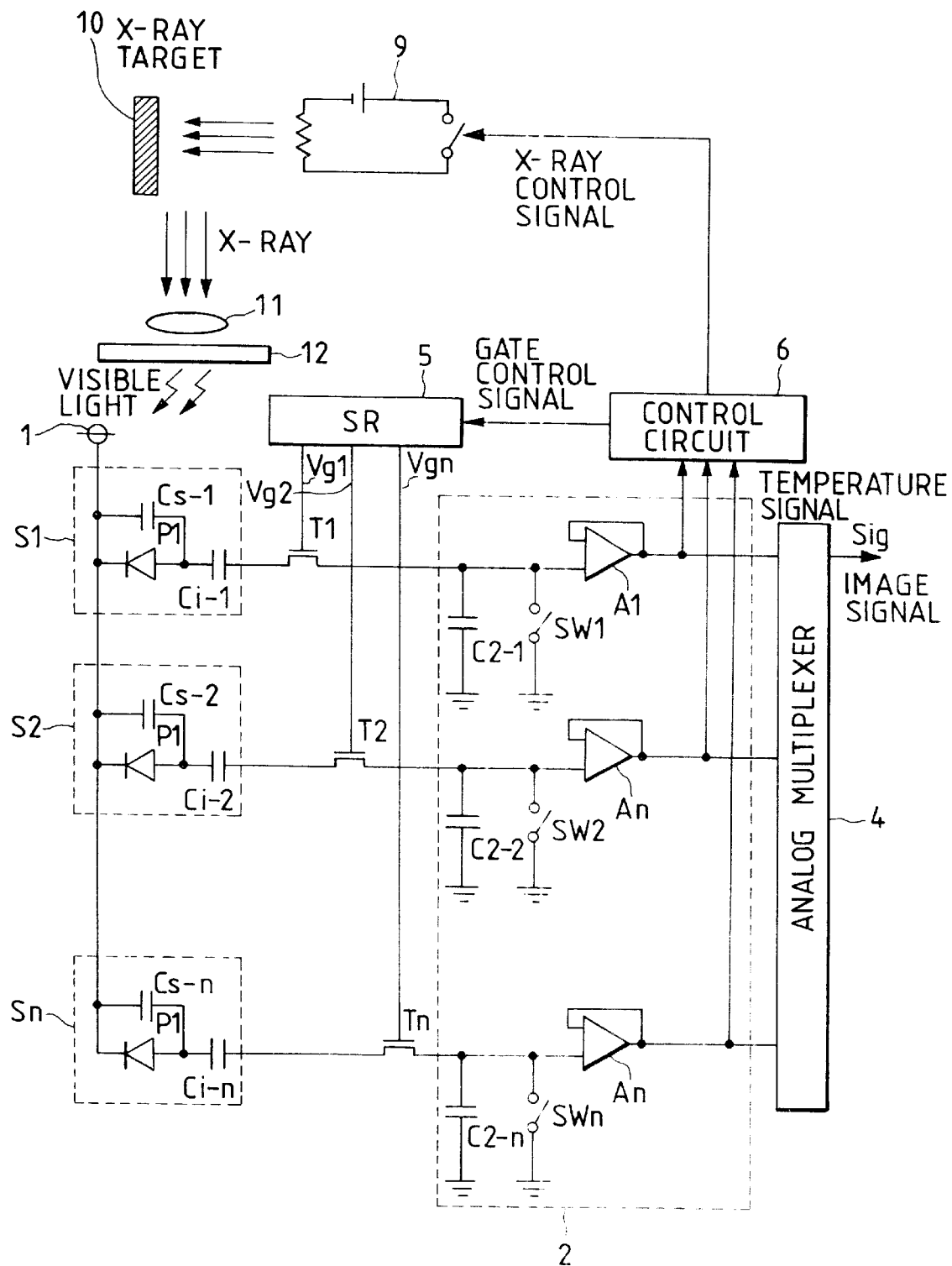
FIG. 25 is a schematic circuit structural drawing to show an example of an imaging apparatus.

The system having the photoelectric conversion apparatus as described below uses X-rays as a light source. Further, the system uses sensors of the MIS structure as photoelectric conversion elements. FIG. 23 is an equivalent circuit of one pixel of the photoelectric conversion apparatus. FIG. 24 is a schematic cross-sectional view to show an example of the layer structure of photoelectric conversion element and TFT. FIG. 25 is a schematic structural drawing.

In FIG. 25, numeral 9 designates a power supply for X-rays, and the cathode thereof emits thermal electrons when the switch is turned on. Numeral 10 denotes an X-ray target (anode), which emits X-rays with bombardment of thermal electrons. The X-rays thus emitted irradiate the subject 11 and X-rays passing through the subject 11 are converted by a fluorescent body 12 as a wavelength converter to wavelengths that can be sensed by the photoelectric conversion elements, such as visible light. Then the light after conversion is incident to the photoelectric conversion elements S1 to Sn. The X-ray power supply 9 is controlled by an X-ray control signal output from the control circuit 6.

As seen from FIG. 24, the photoelectric conversion elements and TFTs of the present embodiment have the same layer structure and thus, can be formed simultaneously by amorphous silicon film-forming processes.

Figure 26A:
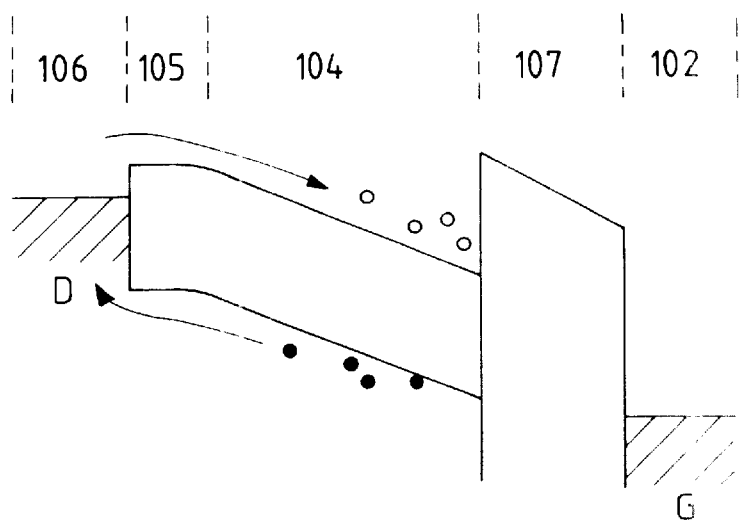
FIGS. 26A, 26B and 26C are schematic energy band diagrams for explaining the operation of photoelectric conversion element.
Figure 26B:
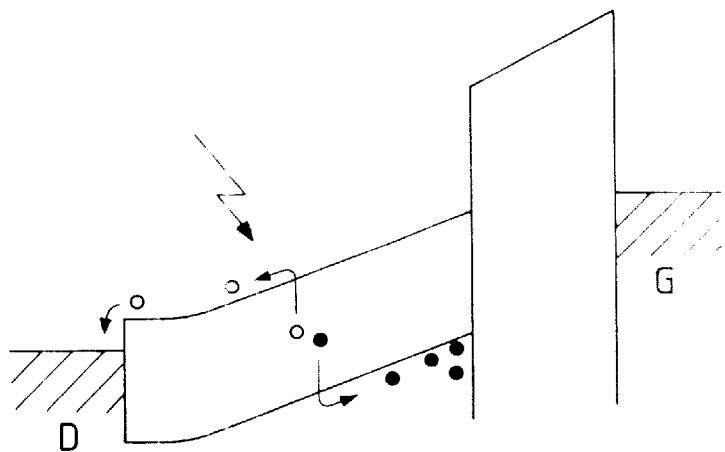

Now described is the operation of the MIS photoelectric conversion element used in the present embodiment. FIG. 26A and FIG. 26B are schematic energy band diagrams of photoelectric conversion element to show the operation in a refresh mode and the operation in a photoelectric conversion mode, respectively, which show states in the thickwise direction of the respective layers of the photoelectric conversion element of FIG. 24. Numeral 102 denotes the lower electrode (hereinafter referred to as G electrode) made of Cr. Numeral 107 represents the insulating layer made of SiN for preventing the both electrons and holes from passing therethrough and the thickness thereof is set to be a thickness that can prevent the electrons and holes from moving therethrough by the tunnel effect, specifically 500 or more Å. Numeral 104 is the photoelectric conversion semiconductor layer made of an intrinsic semiconductor i-layer of hydrogenated amorphous silicon a-Si, 105 the injection preventing layer of n-type a-Si for preventing the holes from being injected into the photoelectric conversion semiconductor layer 104, and 106 the upper electrode (hereinafter referred to as D electrode) made of Al. In the present embodiment the D electrode does not cover the n-layer completely, but movement of electron is free between the D electrode and the n-layer. Thus, the D electrode and the n-layer are always at the same potential, which the following description assumes as a premise. This photoelectric conversion element has two types of operations in the refresh mode and in the photoelectric conversion mode, depending upon how to apply the voltage to the D electrode and to the G electrode.

In the refresh mode shown in FIG. 26A, a negative potential is given to the D electrode with respect to the G electrode and the holes indicated by dots in the i-layer 104 are guided to the D electrode by the electric field. At the same time, the electrons indicated by circles are injected into the i-layer 104. At this time some holes and electrons are recombined in the n-layer 105 and i-layer 104 to annihilate. If this state continues for a sufficiently long time, the holes in the i-layer 104 will be swept away from the i-layer 104.

For changing this state into the photoelectric conversion mode shown in FIG. 26B, a positive potential is given to the D electrode with respect to the G electrode. Then, the electrons in the i-layer 104 are guided momentarily to the D electrode. However, since the n-layer 105 serves as an injection preventing layer, the holes are not guided into the i-layer 104. If light is incident into the i-layer 104 in this state, the light will be absorbed to generate electron-hole pairs. These electrons are guided to the D electrode by the electric field while the holes migrate in the i-layer 104 to reach the interface between the i-layer 104 and the insulating layer 107. However, because they cannot move into the insulating layer 107, they remain in the i-layer 104. Since at this time the electrons move to the D electrode while the holes move to the interface to the insulating layer 107 in the i-layer 104, an electric current flows from the G electrode in order to keep the electrically neutral state in the element. This electric current is according to the electron-hole pairs generated by the light and thus is proportional to the incident light. After the photoelectric conversion mode of FIG. 26B is maintained for a certain period and when the state is changed again to the refresh mode of FIG. 26A, the holes having stayed in the i-layer 104 are guided toward the D electrode as described above, so that an electric current according to the holes flows at the same time. The amount of the holes corresponds to the total quantity of the incident light in the photoelectric conversion mode. Although the electric current corresponding to the quantity of electrons injected into the i-layer 104 also flows at this time, this quantity is almost constant and thus, detection can be done with subtraction of the quantity. Namely, the photoelectric conversion elements in the present embodiment can output the quantity of incident light in real time and can also output the total quantity of incident light in a certain period.

Figure 26C:
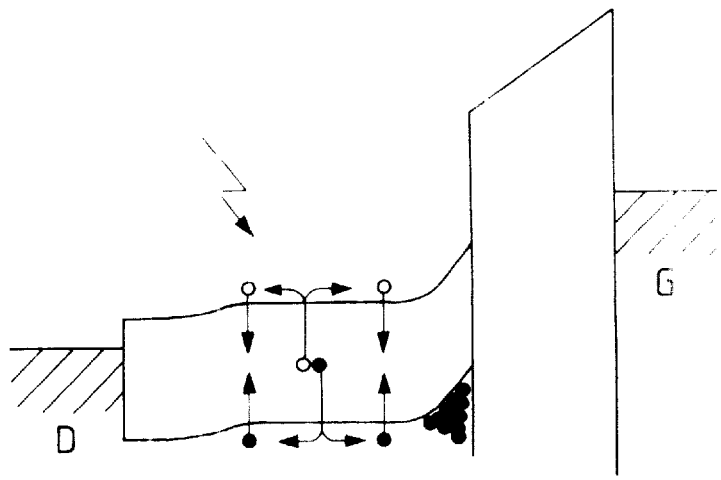

However, if the period of the photoelectric conversion mode becomes longer or if the illuminance of the incident light is too strong for some reason, there would be some cases in which the electric current does not flow even with incidence of light as in D. This is because many holes stay in the i-layer 104, the holes weaken the electric field in the i-layer 104 to stop guide of generated electrons to the D electrode, and the electrons are recombined with the holes in the i-layer 104, as shown in FIG. 26C. If the state of incidence of light is changed in this condition, an unstable electric current could flow in some cases. However, when the state is changed again to the refresh mode, the holes in the i-layer 104 are swept away and an electric current proportional to light can be obtained again in the next photoelectric conversion mode.

In the foregoing description, when the holes in the i-layer 104 are swept away in the refresh mode, the all holes are swept away ideally, but sweeping of part of the holes is also effective to obtain the electric current equal to that described above without any problem. This means that the element needs to be prevented from being in the state of FIG. 26C on the occasion of detection in the next photoelectric conversion mode and it is thus necessary to determine the potential of the D electrode relative to the G electrode in the refresh mode, the period of the refresh mode, and the characteristics of the injection preventing layer of the n-layer 105. Further, injection of electrons into the i-layer 104 in the refresh mode is not a necessary condition, and the potential of the D electrode relative to the G electrode is not limited to negative values. The reason is as follows. If many holes stay in the i-layer 104 and even if the potential of the D electrode relative to the G electrode is positive, the electric field in the i-layer will be applied in the direction to guide the holes to the D electrode. Similarly, as to the characteristics of the injection preventing layer of the n-layer 105, capability of injecting the electrons into the i-layer 104 is not a necessary condition, either.

Figure 27:
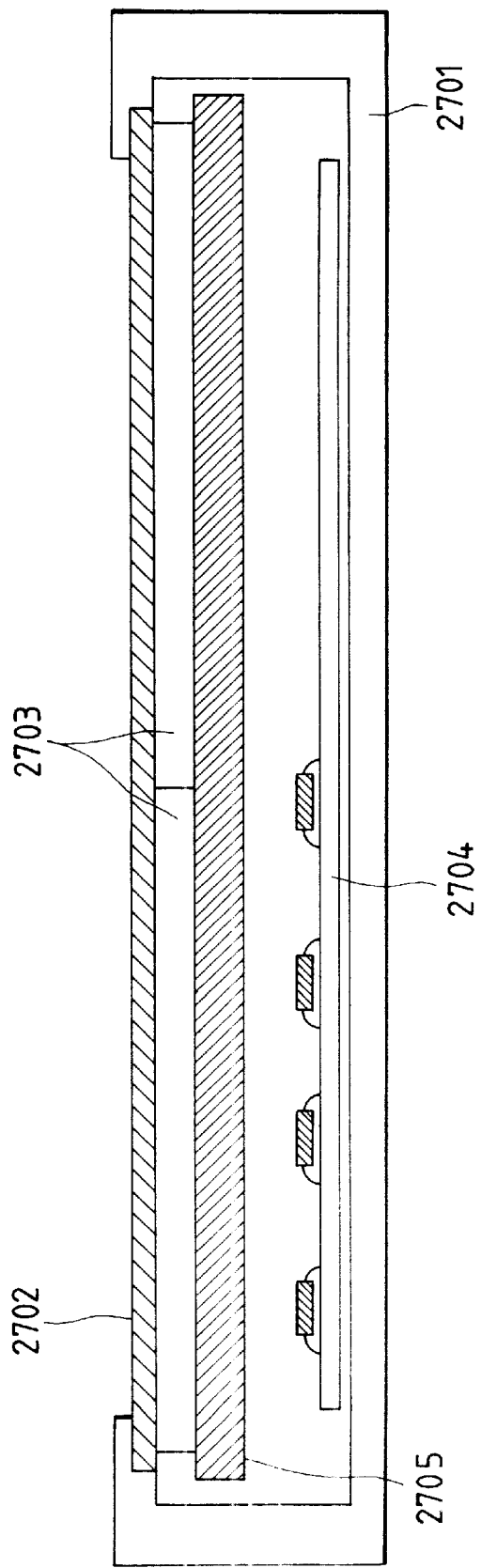
FIG. 27 is a schematic cross-sectional view for explaining an example of a photoelectric conversion apparatus of a cassette type.

Also, the present invention may be applied to such an arrangement that a plurality of substrates are arranged adjacent to each other and that image information is read over a large area. For example, FIG. 27 shows a schematic cross-sectional view of such an apparatus. FIG. 27 shows an example having a fluorescent body 2702 as a wavelength converter, photoelectric conversion element substrates 2703 in which the photoelectric conversion elements are formed, a circuit board 2704, and a shielding member 2705 for preventing radiations such as X-rays, or visible light from passing therethrough and reaching the circuit board 2704 having various elements, in a chassis 2701. The figure is illustrated as omitting the terminals for transmission of signal to or from an external device.

Since the number of elements (for example, ICs) for processing of signal increases with increase of the number of pixels, the photoelectric conversion apparatus of the cassette type enclosed in the chassis 2701 as shown in FIG. 27 is especially likely to be affected by the temperature. Accordingly, it is extremely preferable to apply the temperature control of the present invention to the photoelectric conversion apparatus of this type.

As described above, the present invention can realize the photoelectric conversion apparatus and driving method thereof that can provide good images with little influence on S/N due to the temperature change by the simple structure and method.

Further, the present invention can provide the photoelectric conversion apparatus and driving method thereof with a good dynamic range.

In addition, the present invention can provide the photoelectric conversion apparatus and driving method thereof that can obtain high-quality image information with a lot of gray levels.

It is noted that the present invention is by no means limited to the above-stated examples, but modifications and combinations can be of course made, if necessary, in the scope of the essence or spirit of the present invention.

What is claimed is:

1. A photoelectric conversion apparatus comprising a photoelectric conversion element for converting an incident light signal to an electric signal, a transistor for performing a transfer control of the electric signal from the photoelectric conversion element, and driving means for applying a transfer control signal having a pulse length to a control electrode of the transistor, said photoelectric conversion apparatus comprising:

control means for controlling said driving means so as to detect a temperature of said photoelectric conversion element or said transistor and to cause a change in the pulse length of the transfer control signal, so that in a case where the detected temperature is higher than a reference temperature, the pulse length of the transfer control signal is made shorter relative to a pulse length corresponding to the reference temperature, thereby shortening a transfer time of the electric signal, and in a case where the detected temperature is lower than the reference temperature, the pulse length of the transfer control signal is made longer relative to the pulse length corresponding to the reference temperature, thereby lengthening the transfer time of the electric signal.

2. The photoelectric conversion apparatus according to claim 1, wherein said photoelectric conversion element and said transistor are provided on a same substrate and said control means comprises temperature detecting means for detecting a temperature of said substrate as the detected temperature.

3. The photoelectric conversion apparatus according to claim 2, wherein said temperature detecting means is provided on the same substrate as said photoelectric conversion element and said transistor are provided.

4. The photoelectric conversion apparatus according to claim 1, comprising reading means for reading the electric signal transferred from said transistor, wherein said control means determines the detected temperature, based on an output signal from said reading means.

5. The photoelectric conversion apparatus according to claim 4, wherein said control means determines the detected temperature, based on an output signal from said reading means in a dark state.

6. The photoelectric conversion apparatus according to claim 1, comprising a light source for supplying a light signal incident to said photoelectric conversion element, and means for controlling on/off of said light source.

7. The photoelectric conversion apparatus according to claim 6, said photoelectric conversion apparatus comprising means for effecting changeover between a temperature detection mode and a read mode, wherein in said temperature detection mode said light source is off to achieve the dark state.

8. The photoelectric conversion apparatus according to claim 6, wherein said light source comprises an X-ray source and a wavelength converter for converting at least part of X-rays emitted from the X-ray source to visible light.

9. The photoelectric conversion apparatus according to claim 1, wherein said photoelectric conversion element and said transistor are formed using an amorphous silicon process.

10. The photoelectric conversion apparatus according to claim 1, wherein said photoelectric conversion element is a pin photodiode.

11. The photoelectric conversion apparatus according to claim 1, wherein said photoelectric conversion element is an MIS sensor.

12. The photoelectric conversion apparatus according to claim 1, comprising detected temperature detecting means for performing detection of said temperature.

13. The photoelectric conversion apparatus according to claim 12, wherein said temperature detecting means comprises a thermocouple.

14. The photoelectric conversion apparatus according to claim 12, wherein said temperature detecting means comprises a semiconductor element.

15. The photoelectric conversion apparatus according to claim 14, wherein said semiconductor element is a diode.

16. The photoelectric conversion apparatus according to claim 12, wherein said temperature detecting means comprises a resistor.

17. The photoelectric conversion apparatus according to claim 12, wherein said temperature detecting means comprises a bi-metal.

18. A driving method of a photoelectric conversion apparatus having a photoelectric conversion element, a transistor for transferring a signal from said photoelectric conversion element, and driving means for supplying a drive pulse having a pulse length to a control electrode of said transistor, said driving method comprising:

a first step of measuring a temperature of said photoelectric conversion element or transistor; and a second step of comparing a measured temperature obtained in the first step with a reference temperature, and changing the pulse length of said drive pulse according to the compared temperatures.

19. The driving method according to claim 18, wherein said measured temperature is a temperature near said photoelectric conversion element or said transistor.

20. The driving method according to claim 19, wherein said measured temperature is measured utilizing temperature detecting means.

21. The driving method according to claim 18, wherein said measured temperature is determined based on a quantity of charge accumulated based on a dark current of said photoelectric conversion element.

22. The driving method according to claim 21, comprising a step of performing an accumulation operation of said dark current for a desired time in such a state that light is not incident to said photoelectric conversion element, and a step of transferring the charge during the length of the drive pulse.

23. The driving method according to claim 18, wherein said second step comprises shortening the drive pulse length when the measured temperature is higher than the reference temperature.

24. The driving method according to claim 18, wherein said second step comprises lengthening the drive pulse length when the measured temperature is lower than the reference temperature.

25. An image input apparatus comprising:
   a two dimensional area sensor having a plurality of pixels each comprising a thin film transistor for converting an incident quantity of X-rays into an electric signal and for outputting the electric signal;
   temperature detecting means arranged for obtaining information regarding temperature of at least one of said plurality of pixels; and
   control means for determining a pulse length of a drive pulse to be applied to a control electrode of the thin film transistor, wherein the drive pulse length is based on the temperature information obtained from said temperature detecting means.

* * * * *

UNITED STATES PATENT AND TRADEMARK OFFICE
CERTIFICATE OF CORRECTION

PATENT NO. : 6,271,880 B1
DATED : August 7, 2001
INVENTOR(S) : Toshio Kameshima et al.

It is certified that error appears in the above-identified patent and that said Letters Patent is hereby corrected as shown below:

Title page, Item [54] and Column 1, lines 1, 6 and 7,
Title, "APPARATUS" should read -- PHOTOELECTRIC CONVERSION APPARATUS --; "THE CONVERSION" should read -- THE PHOTOELECTRIC CONVERSION --; and "TRANSISTOR" should read -- TRANSISTOR, AND METHOD FOR DRIVING THE SAME --.

Item [56], References Cited, FOREIGN PATENT DOCUMENTS,
"561559A2" should read -- 561599A2 --.

Column 8,
Line 21, "cathod)" should read -- cathode) --.

Column 10,
Line 66, "little" should read -- few --.

Column 18,
Line 15, "thickwise" should be deleted; and
Line 16, "direction" should read -- direction of the thickness --.

Column 19,
Line 31, "the all" should read -- all the --.

Column 21,
Line 24, "detected" should be deleted; and
Line 25, "temperature." should read -- detected temperature. --.

Signed and Sealed this

Tenth Day of September, 2002

Attest:

JAMES E. ROGAN
*Attesting Officer*     *Director of the United States Patent and Trademark Office*